US011385865B2

(12) United States Patent
Hill

(10) Patent No.: US 11,385,865 B2
(45) Date of Patent: *Jul. 12, 2022

(54) ELECTROMECHANICAL APPARATUS, SYSTEM, AND METHOD FOR GENERATING TRUE RANDOM NUMBERS

(71) Applicant: Real Random IP, LLC, Tampa, FL (US)

(72) Inventor: Douglass A. Hill, Marco Island, FL (US)

(73) Assignee: REAL RANDOM IP, LLC, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/402,443

(22) Filed: Aug. 13, 2021

(65) Prior Publication Data

US 2021/0373854 A1    Dec. 2, 2021

Related U.S. Application Data

(63) Continuation-in-part of application No. 16/823,286, filed on Mar. 18, 2020.

(51) Int. Cl.
G06F 7/58 (2006.01)
H04L 9/08 (2006.01)
G06Q 20/38 (2012.01)

(52) U.S. Cl.
CPC ............ G06F 7/588 (2013.01); H04L 9/0869 (2013.01); *G06Q 20/382* (2013.01); *H04L 2209/08* (2013.01)

(58) Field of Classification Search
CPC ................................ G06F 7/588; H04L 9/0869
See application file for complete search history.

(56) References Cited

U.S. PATENT DOCUMENTS 5,732,138 A * 3/1998 Noll ..................... G06F 7/582
380/46
10,430,161 B1   10/2019 Tatarkiewicz
(Continued)

FOREIGN PATENT DOCUMENTS

CN    106980490 A    7/2017
CN    108958706 A    12/2018

OTHER PUBLICATIONS

Real Random IP, LLC, International Search Report and Written Opinion, PCT/US2021/014202, dated May 3, 2021, 9 pgs.

*Primary Examiner* — Michael D. Yaary
(74) *Attorney, Agent, or Firm* — Morgan, Lewis & Bockius LLP

(57) ABSTRACT

An apparatus generates truly random numbers. The apparatus includes a container that is at least partially filled with a fluid (e.g., water or air). The apparatus also includes objects (e.g., dice) suspended freely in the fluid. The apparatus includes agitators configured to agitate the fluid, and cameras configured to capture images of the objects. When the agitators agitate the fluid, the objects move freely (e.g., move with the created currents) in the fluid in the container. The apparatus also includes a random number generation circuit coupled to the cameras. The random number generation circuit is configured to generate random numbers based on the images captured by the cameras. In some embodiments, the agitators are one or more motor-driven propellers that stir the fluid. Some embodiments use a hydraulic pump to agitate the fluid (e.g., circulating the fluid using both a push action and a pull action).

20 Claims, 27 Drawing Sheets

(56) References Cited

U.S. PATENT DOCUMENTS

| | | |
|---|---|---|
| 10,901,695 B1 | 1/2021 | Tatarkiewicz |
| 11,048,478 B1 | 6/2021 | Tatarkiewicz et al. |
| 2019/0182407 A1* | 6/2019 | Wang .................. H04N 1/4486 |

* cited by examiner

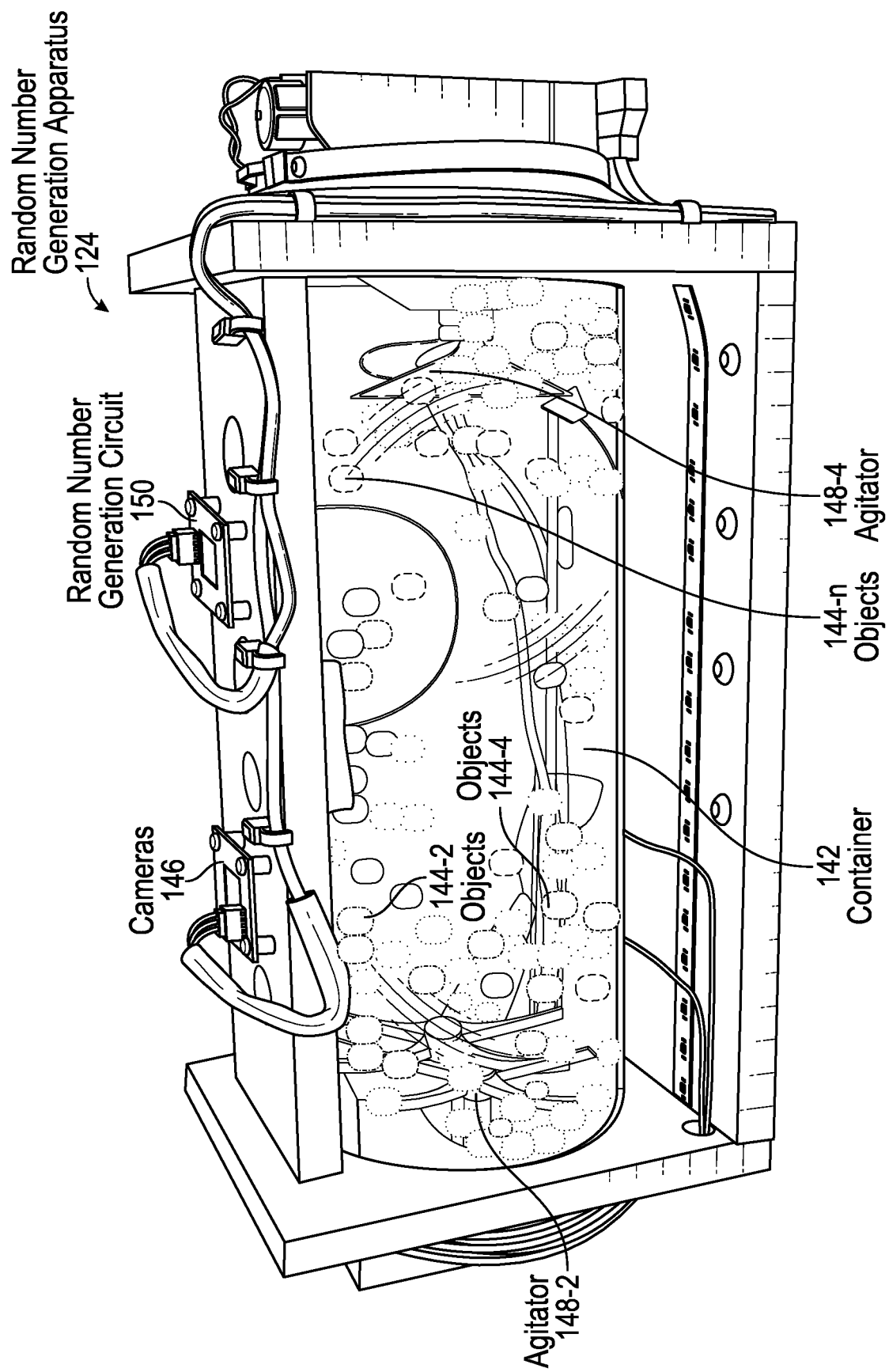

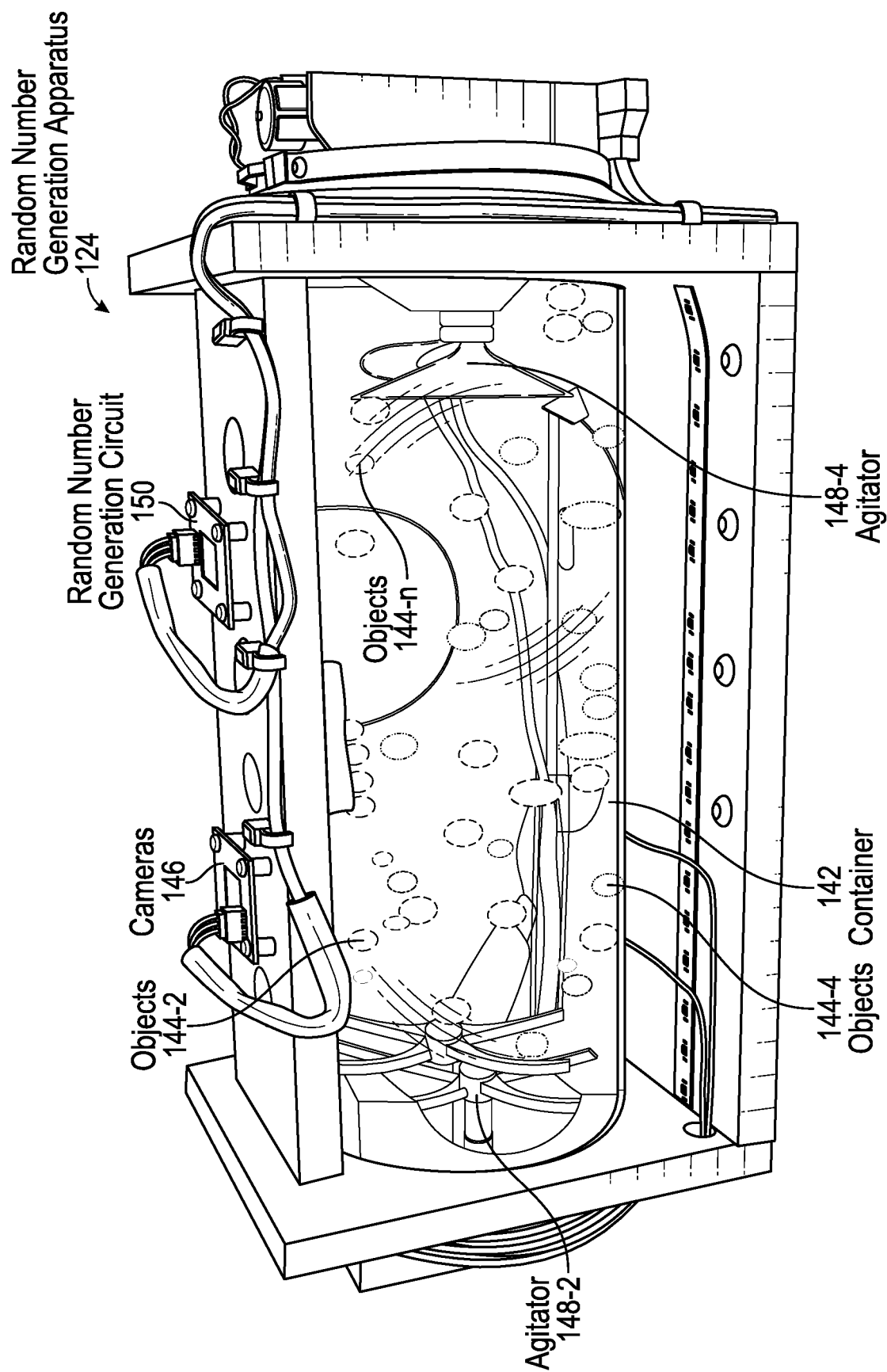

ELECTROMECHANICAL APPARATUS, SYSTEM, AND METHOD FOR GENERATING TRUE RANDOM NUMBERS

CROSS REFERENCE TO RELATED APPLICATIONS

This application is a continuation-in-part of U.S. patent application Ser. No. 16/823,286, filed Mar. 18, 2020, entitled "Electromechanical Apparatus, System, and Method for Generating True Random Numbers," which is incorporated by reference herein in its entirety.

TECHNICAL DATA FIELD

This application relates generally to random number generators, including but not limited to generating true random numbers using an electromechanical apparatus, for cryptographic applications.

BACKGROUND

Random number generation is a critical component of computer and Internet security. Problems with pseudorandom number generators (e.g., seeded computational algorithms or deterministic logic) are well known. For example, an entire random sequence generated by a pseudorandom number generator can be reproduced if the seed value is known. Physical random number generators, on the other hand, use chaotic systems, and are good sources of entropy (randomness or unpredictability). Conventional true random number generators have typically used means, such as radiation decay, thermal noise or oscillator imperfections, for generating random numbers. However, traditional techniques suffer from inherent localities (e.g., present predictable results), are too sensitive to external influences (e.g., thermal noise is affected by temperature fluctuations), and/or suffer from efficiency limitations (e.g., too slow). Some systems tend to be bulky, and/or require complex setup/maintenance, and therefore are unsuitable for use in data centers.

SUMMARY

Accordingly, there is a need for efficient and compact devices that can generate true random numbers (sometimes called entropy). The embodiments herein address the problem of generating true random numbers using an electromechanical device that can fit in traditional data centers. Various embodiments that incorporate or use the apparatus for cryptographic applications are described. For example, the apparatus, and the methods described here, can be used to provide Entropy As A Service (EAAS).

According to some embodiments, an apparatus is provided for generating truly random numbers. The apparatus includes a container that is at least partially filled with a viscous fluid (e.g., a liquid, such as water, or a gas, such as air). In some embodiments, the container is at least partially filled with fragments (e.g., fragments of bird feathers). One or more objects (e.g., dice) are suspended freely in, added to, dispersed in, or distributed in, the fluid. The apparatus includes one or more agitators configured to agitate (e.g., stir or circulate) the fluid. The apparatus also includes one or more cameras configured to capture one or more images of the one or more objects. The apparatus also includes a random number generation circuit coupled to the one or more cameras. The random number generation circuit is configured to generate random numbers based on the one or more images captured by the one or more cameras. When the one or more agitators agitate the fluid, the one or more objects move freely in the fluid in the container.

In some embodiments, each object includes one or more physical features. The one or more images captured by the one or more cameras include a subset of physical features of the one or more physical features of the one or more objects. The random number generation circuit is further configured to generate the random numbers based on detecting the subset of physical features in the one or more images. In some embodiments, the one or more objects include dice. The one or more physical features include dots on faces of each dice. In some embodiments, the features include color, shade, and/or number of faces/sides of each die. In some embodiments, the subset of physical features include one or more dots of each die, and the random number generation circuit is further configured to generate the random numbers based on number of dots detected in the one or more images. In some embodiments, the captured images are hashed for the image noise, then converted to binary.

In some embodiments, the apparatus includes a housing configured to fit in a server rack. For example, the housing is sized and/or shaped (e.g., cut) to fit into any server rack environment, such as a 4U rack assembly or a 2U rack assembly. The container is disposed in the housing. In some embodiments, the housing includes opposing first and second ends, with a first agitator attached to the first end of the housing and a second agitator attached to the second end of the housing. In some embodiments, the housing includes a top portion and a bottom portion. In some embodiments, the one or more cameras are attached to the outer portion of the housing (e.g., on the top or side), and the one or more cameras are directed toward the interior of the container.

In some embodiments, the apparatus includes one or more lighting units (e.g., a string of LED lights) configured to illuminate the container when the one or more cameras capture the one or more images of the one or more objects, and/or before/after the operation of the agitators. Embodiments are configured to use a variety of lights throughout the spectrum, including visible light, UV light, and infrared light. Some embodiments use several light sources and/or different wavelengths of light. Some embodiments use a single light source and/or a small band of wavelengths.

In some embodiments, the one or more agitators are disposed outside the container, and the one or more agitators are configured to vibrate or shake the container, thereby agitating the fluid to cause the one or more objects to move in the fluid.

In some embodiments, the one or more agitators are disposed within the container, and the one or more agitators are configured to rotate, stirring the fluid.

In some embodiments, the one or more agitators are coupled to one or more motors configured to cause each agitator to rotate, and the random number generation circuit includes a power control unit configured to control power supplied to the one or more motors.

In some embodiments, the one or more agitators comprise a hydraulic pump that circulates the fluid in the container.

In some embodiments, the random number generation circuit is further configured to receive a request, from a user, for a randomized key. In response to receiving the request, the random number generation circuit controls the one or more agitators to agitate the fluid, controls the one or more cameras to capture the one or more images, generates the randomized key based on the one or more images captured by the one or more cameras, and/or provides the randomized key to the user. In some embodiments, the random number generation circuit includes one or more buffers, and a batch of random numbers are generated and stored in the buffers each time the agitators and/or the cameras are activated (e.g., each buffer may store 1000 bits or 1000000 bits). In this case, when a random number or randomized key is requested, the system can generally respond to the request very quickly (e.g., in less than a 1/10 of a millisecond, including the overhead to call the API function).

In some embodiments, the one or more objects have a density similar to the fluid so that (i) the one or more objects suspend freely in the fluid (e.g., move around rather than float/sink), and (ii) when the one or more agitators agitate the fluid, the one or more objects move freely within the fluid.

In some embodiments, the one or more cameras are disposed outside the container, and the container is made of a substantially transparent or see-through material through which the one or more objects are observable. The transparency can also be used as a means for a human to verify that the apparatus is functioning as intended (alternative techniques for generating random numbers generally have no visibility).

In another aspect, a method is provided for generating truly random numbers. The method is performed at an apparatus (e.g., an electro-mechanical device), such as the apparatus described above in reference to the apparatus claims. The method includes receiving a request for generating one or more randomized keys. In response to receiving the request, the method includes agitating, using one or more agitators, a fluid in a container filled with one or more objects that are suspended freely in the fluid, thereby causing the one or more objects to move freely in the container. The method also includes capturing, using one or more cameras, one or more images of the one or more objects. The method also includes generating a randomized key based on the one or more images, and storing the randomized key to a memory unit.

In some embodiments, each object includes one or more physical features. The one or more images captured by one or more cameras include a subset of physical features of the one or more physical features of the one or more objects, and generating the randomized key is further based on detecting the subset of physical features in the one or more images. In some embodiments, the container includes opposing first and second ends, and the one or more agitators include a first agitator attached to the first end and a second agitator attached to the second end. In some embodiments, the method further includes agitating the fluid using the first agitator, ceasing to agitate the fluid using the first agitator, agitating the fluid using the second agitator, and agitating the fluid using the first agitator and the second agitator. In some embodiments, the captured images are hashed for the image noise, then converted to binary.

In another aspect, a system generates truly random numbers. The system includes one or more random number generation units. Each random number generation unit includes a container that is at least partially filled with a fluid, one or more objects suspended freely in the fluid, one or more agitators configured to agitate the fluid, one or more cameras configured to capture one or more images of the one or more objects, and a random number generation circuit coupled to the one or more cameras and configured to generate random numbers based on the one or more images captured by the one or more cameras. When the one or more agitators agitate the fluid, the one or more objects move freely in the fluid in the container. The system also includes a memory unit coupled to the one or more random number generation units. The memory unit is configured to store the random numbers generated by the one or more random number generation units.

In some embodiments, the system includes a controller unit coupled to the memory unit. The controller unit (e.g., an entropy server) is configured to receive a request, from a user, for a randomized key. In response to receiving the request, the system retrieves a random number from the memory unit, generates the randomized key based on the random number retrieved from the memory unit, and provides the randomized key to the user. In some embodiments, the controller unit is further configured to delete the random number from the memory unit after it is used. In some embodiments, the controller unit is coupled to the one or more random number generation units. The controller unit is further configured to determine if the number of random numbers (e.g., bits) stored by the memory unit is below a threshold. In accordance with a determination that the number of random numbers stored by the memory unit is below the threshold, the controller unit selects a candidate random number generation unit from the one or more random generation units. For the candidate random generation unit, the controller unit controls the one or more agitators to agitate the fluid, controls the one or more cameras to capture the one or more images, and generates one or more random number based on the one or more images captured by the one or more cameras. The system causes the memory unit to store the random numbers generated by the candidate random generation unit.

Thus, apparatuses, methods, and systems are provided for generating truly random numbers.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures and specification.

FIGS. 4A-4C and 5A-5D illustrate the operation of the example apparatus shown in FIG. 3, according to some embodiments.

FIGS. 6A-6C illustrate the example apparatus shown in FIG. 3 after operation, according to some embodiments.

DESCRIPTION OF EMBODIMENTS

Figure 1:
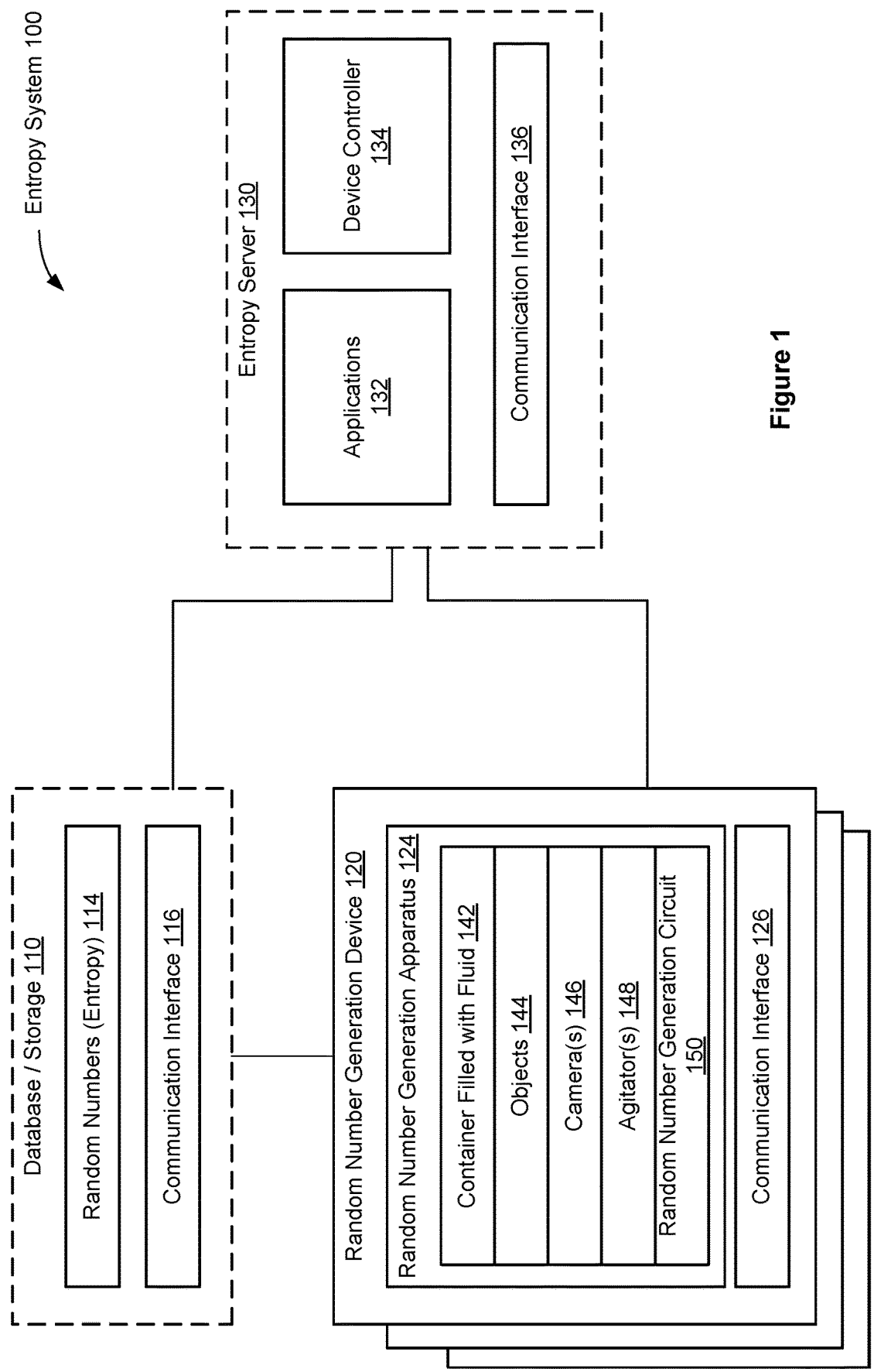
FIG. 1 is a block diagram of a system for generating truly random numbers, according to some embodiments.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" means "when" or "upon" or "in response to determining" or "in response to detecting" or "in accordance with a determination that," depending on the context. Similarly, the phrase "if it is determined" or "if [a stated condition or event] is detected" means "upon determining" or "in response to determining" or "upon detecting [the stated condition or event]" or "in response to detecting [the stated condition or event]" or "in accordance with a determination that [a stated condition or event] is detected," depending on the context.

It will also be understood that, although the terms first, second, etc. are, in some instances, used herein to describe various elements, these elements should not be limited by these terms. These terms are used only to distinguish one element from another.

Entropy As A Service (EAAS)

Entropy As A Service (EAAS) is an emerging technology, and there are no known standards on how to retrieve entropy in a secure fashion from an EAAS provider. Entropy is lack of order or predictability, or in other words, true randomness. With modern computing systems, entropy is used in a variety of ways, from picking random selections on your playlist to securing the launch codes of nuclear missiles. The quality of entropy becomes important in complex systems. For example, if the same pattern is used over and over again to create a security key, then that key may be easily guessed or deduced by an adversary. Entropy providers must constantly test themselves to reassure their customers that the randomness has no detectable patterns contained within.

A problem with modern computing systems is that a true source of randomness cannot be found on must CPUs. Conventional CPUs use a Pseudo-Random-Number-Generator (PRNG) to create entropy when needed. PRNG entropy is considered low quality and can be safely used in limited situations when the entropy can have a pattern. But if the entropy is to be used to create private keys, then the source of the entropy must be an unguessable sequence that an attacker cannot deduce. Some computers use seemingly random sources of entropy on a computer, such as mouse movement, disk seek latency, and other sources. While these sources provide generally good entropy, they require the computer system to be running for many hours or days in order to be able to provide ample entropy. In certain situations, such as a web server, this may not be enough to keep up; the web server will either stall waiting for entropy or have to revert to using a PRNG. This means that most computers need an external source of entropy in order to create high quality keys to be used in critical situations. The disclosed inventions include various embodiments of Entropy as a Service (EaaS or EAAS) architecture.

FIG. 1 is a block diagram of an entropy system 100 (sometimes called a random number generation system) for generating truly random numbers, according to some embodiments. While some example features are illustrated, various other features have not been illustrated for the sake of brevity and so as not to obscure pertinent aspects of the example embodiments disclosed herein. To that end, as a non-limiting example, the system 100 includes one or more random number generation devices 120. In some embodiments, the one or more random number generation devices 120 are used in conjunction with an entropy server 130 (sometimes referred to a "computer system"), and/or an entropy database 110. In some embodiments, the system 100 provides the functionality of an entropy generation device with entropy applications (e.g., randomized key generation for cryptography).

In some embodiments, the database 110 stores random numbers (entropy) 114. In some embodiments, the database 110 includes a communication interface 116. The communication interface 116 enables input and output to the computer system 130. In some embodiments, the communication interface 116 is a single communication channel, such as HDMI, USB, VGA, DVI, or DisplayPort. In other embodiments, the communication interface 116 includes several distinct communication channels operating together or independently. In some embodiments, the communication interface 116 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi) and/or any other suitable communication protocol. The wireless and/or wired connections may be used for sending data from the database 110 to the computer system 130. In some embodiments, the communication interface 116 may also receive random numbers 114 (e.g., from the random number generation devices 120) to be stored in the database 110.

Each of the random number generation devices 120 may be integrated within a server. The random number generation device 120 includes a random number generation apparatus 124, and a communication interface 126. The random number generation device 120 may include additional components that are not shown in FIG. 1, such as a power source (e.g., an integrated battery, a connection to an external power source, a container containing compressed air, or some combination thereof), one or more processors, and memory.

The random number generation device 120 is configured to generate random numbers. To accomplish this, the random number generation device 120 includes one or more random number generation apparatuses 124, each of which is configured to generate random numbers independently of the others. Each random number generation apparatus 124 is able to create different random numbers by acting alone, or by acting in consort (e.g., in cooperation with other apparatuses and/or devices, such as image processing devices).

Each random number generation apparatus 124 includes at least one container 142 filled with fluid (e.g., air, water, or similar liquid) or fragments (e.g., feathers), which allow objects 144 (e.g., dice) to move freely. Agitators 148 (e.g., fans) stir the fluid in the container 142. One or more cameras 146 in the apparatus take pictures (and/or videos) of the objects in the fluid in the container. A random number generation circuit 150 generates random numbers based on features extracted (e.g., shape, number of dots, and/or color) from the images (or videos) captured by the cameras 146, according to some embodiments. In some embodiments, the cameras 146 are external to the apparatus 124. For example, the cameras 146 are positioned opposite to (with a view of) the container 142. In some embodiments, the random number generation circuit 150 is coupled to the cameras 146, but decoupled from the apparatus 124.

The communication interface 126 enables input and output to the computer system 130. In some embodiments, the communication interface 126 is a single communication channel, such as USB. In other embodiments, the communication interface 126 includes several distinct communication channels operating together or independently. For example, the communication interface 126 may include separate communication channels for receiving control signals for the random number generation apparatus 124, and sending data from the random number generation apparatus 124 to the computer system 130 and/or to the database 110. The one or more communication channels of the communication interface 126 can be implemented as wired or wireless connections. In some embodiments, the communication interface 126 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document.

Figure 2:
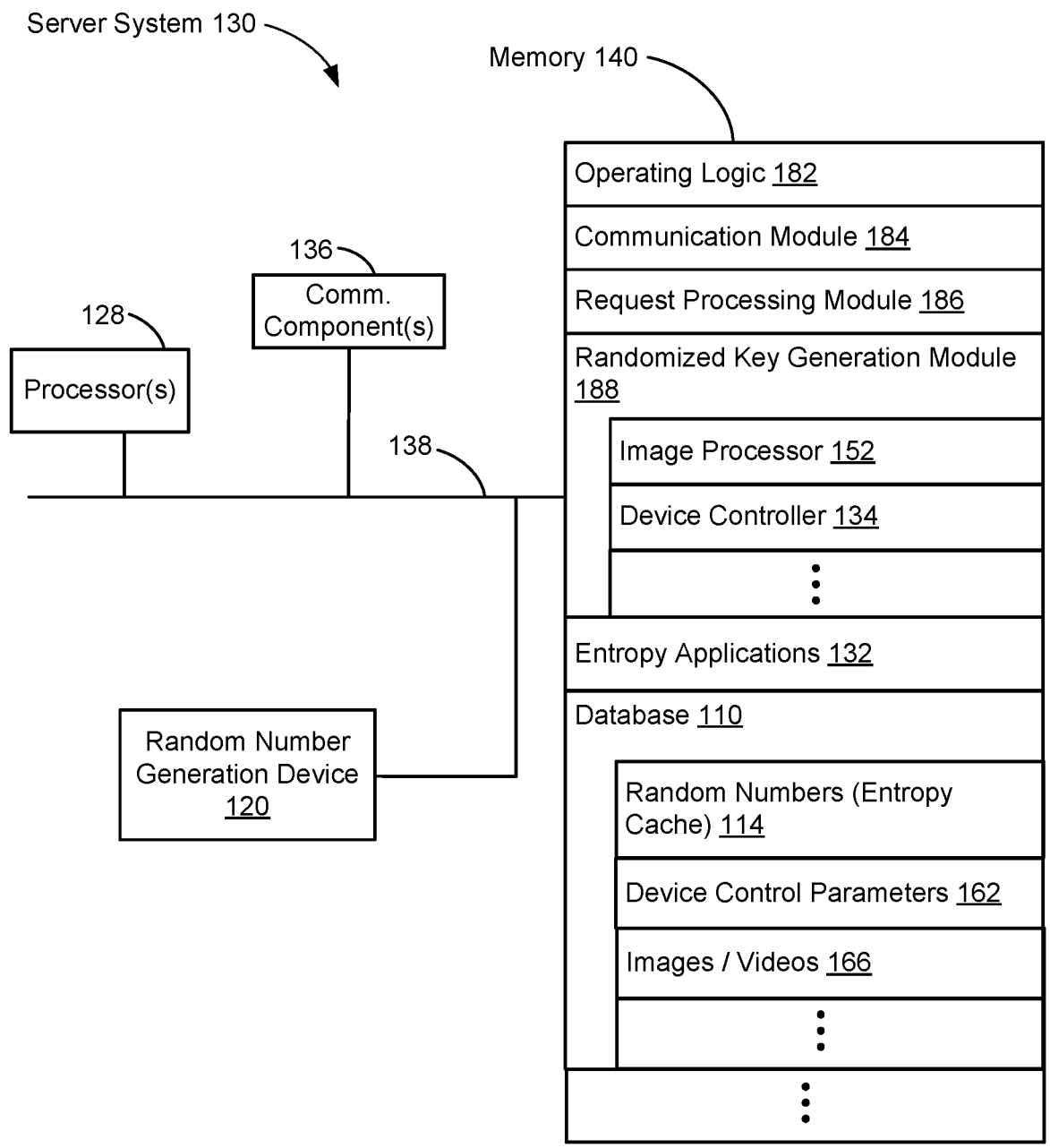
FIG. 2 is a block diagram of a computer system for generating truly random numbers, according to some embodiments.

FIG. 2 is a block diagram of the computer system 130 (or the entropy server) shown in FIG. 1. In some embodiments, the computer system 130 is a computing device that executes applications 132 (e.g., entropy applications) to process data (e.g., random numbers) from the random number generation device 120. In some embodiments, the entropy server 130 generates control signals for the random number generation device 120. In some embodiments, the computer system 130 sends instructions or control signals to the random number generation device 120 using a communication interface 136. In response to receiving the instructions, the random number generation device 120 generates random numbers (e.g., using the random number generation apparatus 124). Alternatively, in some embodiments, the computer system 130 sends instructions to an external device, such as a wearable device, or some other Internet of things (JOT) device, and in response to receiving the instructions, the external device creates one or more random numbers through the random number generation device 120 (e.g., the output data bypasses the random number generation device 120). Although not shown, in the embodiments that include a distinct external device, the external device may be connected to the database 110, the random number generation device 120, and/or the computer system 130 via a wired or wireless connection.

In some embodiments, the computer system 130 sends instructions to the database 110 using a communication interface 136, to retrieve random numbers. In response to receiving the instructions, the database 110 may return random numbers 114 via the interface 116. In some embodiments, the random numbers stored in the database may be associated with the one or more random numbers generated by the random number generation device 120.

The computer system 130 can be implemented as any kind of computing device, such as an integrated system-on-a-chip, a microcontroller, a console, a desktop or laptop computer, a server computer, a tablet, a smart phone, or other mobile device. Thus, the computer system 130 includes components common to typical computing devices, such as a processor, random access memory, a storage device, a network interface, an I/O interface, and the like. The processor may be or include one or more microprocessors or application specific integrated circuits (ASICs). The memory may be or include RAM, ROM, DRAM, SRAM, and MRAM, and may include firmware, such as static data or fixed instructions, BIOS, system functions, configuration data, and other routines used during the operation of the computing device and the processor. The memory also provides a storage area for data and instructions associated with applications and data handled by the processor.

The storage device provides non-volatile, bulk, or long term storage of data or instructions in the computing device. The storage device may take the form of a magnetic or solid state disk, tape, CD, DVD, or other reasonably high capacity addressable or serial storage medium. Multiple storage devices may be provided or are available to the computing device. Some of these storage devices may be external to the computing device, such as network storage or cloud-based storage. The network interface includes an interface to a network and can be implemented as either a wired or a wireless interface. The I/O interface connects the processor to peripherals (not shown) such as sensors, displays, cameras, color sensors, microphones, keyboards, and/or USB devices.

In the example shown in FIG. 1, the computer system 130 includes applications 132 (e.g., cryptography applications) and a device controller 134 for the random number generation device 120. In some embodiments, the applications 132 and the device controller 134 are implemented as software modules that are stored on the storage device and executed by the processor. Some embodiments of the computer system 130 include additional or different components than those described in conjunction with FIG. 1. Similarly, the functions further described below may be distributed among components of the computer system 130 in a different manner than is described here.

In some embodiments, each application 132 is a group of instructions that, when executed by a processor, generates cryptographic content. An application 132 may generate cryptographic content in response to inputs received from a user via operation of the random number generation device 120. Examples of applications 132 include cryptographic applications, such as applications for electronic commerce, chip-based payment cards, digital currencies, computer passwords, and communications.

In some embodiments, the device controller 134 is a software module that allows applications 132 to operate in conjunction with the database 110 and/or the random number generation device 120. In some embodiments, the device controller 134 receives information from the database 110 and provides the information to an application 132. Based on the received information, the device controller 134 determines cryptographic or encrypted content to provide to the database 110 to store and/or satisfy user requests for random numbers.

Similarly, in some embodiments, the device controller 134 receives random numbers from the random number generation device 120 and provides the information to an application 132. The application 132 can use the information to perform an action (e.g., satisfy a user request for encrypted data). In some embodiments, the device controller 134 generates control signals for the random number generation apparatus 124, which causes the apparatus 124 to generate random numbers. As noted above, the information received by the device controller 134 can also include information from the database 110. For example, the database 110 may store random numbers 114 generated by the random number generation device 120, and the application 132 can use this additional information to perform one or more actions within the application 132.

In some embodiments, the computer system 130 includes one or more processing units 128 (e.g., CPUs, microprocessors, and the like), a communication interface 136 (similar to the communication interfaces 116 and 126), memory 140, and one or more communication buses 138 for interconnecting these components (sometimes called a chipset). In some embodiments, the computer system 130 includes camera interfaces to communicate with cameras (e.g., the cameras 146 or any external cameras), to receive images and/or videos captured by the cameras.

In some embodiments, the memory 140 in the computer system 130 includes high-speed random access memory, such as DRAM, SRAM, DDR SRAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. The memory, or alternatively the non-volatile memory within memory, includes a non-transitory computer-readable storage medium. In some embodiments, the memory, or the non-transitory computer-readable storage medium of the memory, stores the following programs, modules, and data structures, or a subset or superset thereof:

- operating logic 182, including procedures for handling various basic system services and for performing hardware dependent tasks;
- a communication module 184, which couples to and/or communicates with remote devices (e.g., the random number generation device 120, the database 110, and/or other wearable, IoT, or smart devices) in conjunction with the communication interface 136;
- a request processing module 186, which processes requests for random number generation;
- a randomized key generation module 188, which includes, in some embodiments, an image processor 152 to process images received from the cameras and/or a device controller 134 for generating control signals that control operation of the random number generation device 120. For example, the request processing module 186 of the server 130 receives user requests for randomized keys. In response, the device controller 134 generates control signals to start and/or stop operations of the agitators. In some embodiments, the device controller 134 generates control signals to capture images via the cameras 146. In some embodiments, the device controller 134 generates control signals to use the random number generation circuit 150 to process images captured by the cameras 146, to generate random numbers to satisfy the user request. In some embodiments, the image processing module 152 processes images captured by the cameras 146 to generate random numbers and/or cryptographic/randomized keys to satisfy the user request. In some instances, the randomized key generation module 188 is able to satisfy a request using random numbers 114 already stored in the database 110 (i.e., the database acts as a buffer);
- one or more entropy applications 132, including cryptographic applications as described above in reference to FIG. 1; and
- a database 110, which stores:
  - random numbers 114 previously generated but not yet used (e.g. stored as a sequence of 8-bit bytes, 64-bit blocks, or 256-bit blocks). This is also referred to as the entropy cache;
  - device control parameters 162 for use by the device controller 134. For example, the parameters 162 include threshold duration for operating the agitators 148 (e.g., 2 seconds for each agitator operated independently, 2 seconds for a first agitator, followed by 4 seconds for concurrent operation of the agitators), a duration to wait after operating the agitators 148 to take pictures using the cameras 146, and parameters to control the random number generation circuit 150. In some embodiments, the time frame for agitation is randomized based upon random values previously generated to further ensure that the results can never be replicated; and
  - images and/or videos 166 received from the cameras 146 and/or external cameras.

Figure 3:
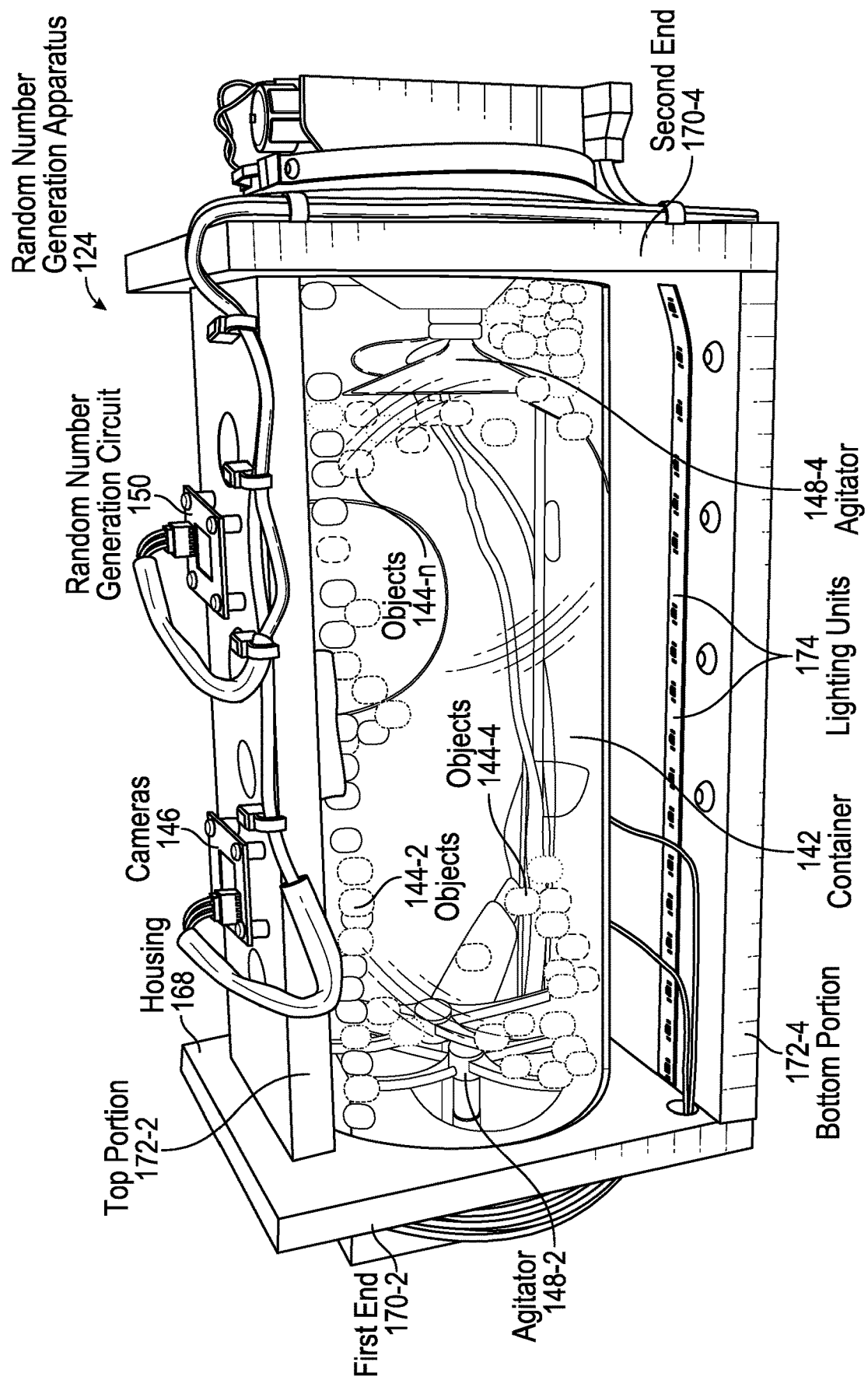
FIG. 3 illustrates an example apparatus for generating truly random numbers, according to some embodiments.

FIG. 3 illustrates an example apparatus 124 for generating truly random numbers, according to some embodiments. The apparatus 124 includes a container 142 that is at least partially filled with a fluid (e.g., a liquid, such as water, or a gas, such as air). Embodiments typically use a viscous fluid. In some embodiments, the container is at least partially filled with fragments (e.g., fragments of bird feathers). One or more objects (e.g., dice) 144 are suspended freely in, added to, dispersed in, or distributed in, the fluid. The apparatus 124 includes one or more agitators 148 configured to stir the fluid. In some embodiments, the time frame for agitation is randomized based upon random values previously generated. This further ensures that the results can never be replicated. The agitator initiation is based upon a seed value. Some embodiments prove randomness using statistical methods. In some embodiments, the degree of randomness is monitored by a continuous health test provided by the Diehard suite (see https://en.wikipedia.org/wiki/Diehard tests). Once the test results are positive and verified, the entropy is published to the EAAS server.

Note that the spinning of the dice (and/or other objects) in the liquid cannot be modeled by particle simulation or predicted. In particular, the random weight and mixture of viscous fluid, the randomization of the agitators, and the multiple color values used ensure that it is impossible to replicate by particle simulation.

The apparatus 124 also includes one or more cameras 146 configured to capture one or more images of the one or more objects 144. The cameras are mounted on the outside of the container with clear visibility into the container. In some embodiments, the cameras are mounted on the top, on the bottom, and/or on the sides of the container.

The apparatus also includes a random number generation circuit 150 coupled to the one or more cameras 146. The circuit 150 can be directly attached to the apparatus or remotely situated (either close to the apparatus, such as a couple of feet, or distant from the apparatus, such as a different node on a network). In some embodiments, the circuit 150 comprises a Raspberry Pi device, an SSD device, and the one or more cameras. In some embodiments, the process (i) captures the images, (ii) hashes the images to extract image noise, (iii) converts the hashed images to binary, (iv) tests the binary data using the Diehard suite, then (v) publishes the binary data to the EAAS server. The random number generation circuit 150 is configured to generate random numbers based on the one or more images captured by the one or more cameras 146. When the one or more agitators 148 stir the fluid, the one or more objects 144 move freely in the fluid in the container 142.

In some embodiments, each object 144 includes one or more physical features. The one or more images captured by the one or more cameras 146 include a subset of physical features of the one or more physical features of the one or more objects 144. The random number generation circuit 150 is further configured to generate the random numbers based on detecting the subset of physical features in the one or more images. In some embodiments, the one or more objects 144 include dice. The one or more physical features include dots on faces of each die. In some embodiments, the features include color, shade, and/or number of faces/sides of each die. In some embodiments, the subset of physical features include one or more dots on each die, and the random number generation circuit 150 is further configured to generate the random numbers based on number of dots detected in the one or more images.

In some embodiments, the apparatus 124 includes a housing 168 configured to fit in a server rack. For example, the housing 168 is sized and/or shaped (e.g., cut) to fit into any server rack environment, such as a 4U/rack assembly. The container 142 is disposed in the housing 168. In some embodiments, the housing 168 includes an opposing first end 170-2 and a second end 170-4. A first agitator 148-2 is attached to the first end 170-2 and a second agitator 148-4 is attached to the second end 170-4 of the housing. In some embodiments, the housing 168 includes a top portion 172-2 and a bottom portion 172-4. In some embodiments, the one or more cameras 146 are attached to the top portion 172-2 of the housing, and the one or more cameras 146 are oriented toward the interior of the container 142.

In some embodiments, the apparatus 124 includes one or more lighting units 174 (e.g., a string of LED lights) configured to illuminate the container 142 when the one or more cameras 146 capture the one or more images of the one or more objects 144, and/or before/after the operation of the agitators 148.

In some embodiments, the one or more agitators 148 are disposed outside the container 142, and the one or more agitators 148 are configured to vibrate or shake the container 142 thereby stirring the fluid to cause the one or more objects 144 to move in the fluid.

In some embodiments, the one or more agitators 148 are disposed within the container 142, and the one or more agitators 148 (e.g., fans) are configured to rotate to stir the fluid.

In some embodiments, the one or more agitators 148 are coupled to one or more motors configured to cause each agitator 148 to rotate, and the random number generation circuit 150 includes a power control unit configured to control power supplied to the one or more motors.

In some embodiments, the random number generation circuit 150 is further configured to receive a request (e.g., from a device controller 134) to generate randomized keys. In response to receiving the request, the random number generation circuit 150 controls the one or more agitators 148 to stir the fluid, controls the one or more cameras 146 to capture the one or more images, generates the randomized keys based on the one or more images captured by the one or more cameras 146, stores the generated random numbers in the entropy cache 114, and/or provides the generated random numbers to external requestors (e.g., via an API call).

In some embodiments, the one or more objects 144 have a density similar to the fluid so that (i) the one or more objects 144 suspend freely in the fluid (e.g., move around rather than float/sink) and (ii) when the one or more agitators 148 stir the fluid, the one or more objects 144 move freely within the fluid.

In some embodiments, the one or more cameras 146 are disposed outside the container 142, and the container 142 is made of a substantially transparent or see-through material through which the one or more objects 144 are observable.

In some embodiments, a system (e.g., the entropy system 100) generates truly random numbers. The system 100 includes one or more random number generation units 124. Each random number generation unit 124 includes a container 142 that is at least partially filled with a fluid, one or more objects 144 suspended freely in the fluid, one or more agitators 148 configured to stir the fluid, one or more cameras 146 configured to capture one or more images of the one or more objects 144, and a random number generation circuit 150 coupled to the one or more cameras 146 and configured to generate random numbers based on the one or more images captured by the one or more cameras 146. When the one or more agitators 148 stir the fluid, the one or more objects 144 move freely in the fluid in the container 142. The system 100 also includes a database 110 coupled to the one or more random number generation units 124. The database 110 is configured to store the random numbers generated by the one or more random number generation units 124.

In some embodiments, the system 100 includes a controller unit 134 (sometimes called the "engine") coupled to the database 110. The controller unit 134 is configured to receive requests for generating random numbers or retrieving random numbers stored in the entropy cache 114. In response to receiving a request from a user device, the system 100 retrieves a random number from the database 110, generates a randomized key based on the random number retrieved from the database 110, and provides the randomized key to the user device. In some embodiments, the controller unit 134 is further configured to delete the random number from the database 110 after use. In some embodiments, the controller unit 134 is coupled to the one or more random number generation devices 120. The controller unit 134 is further configured to determine if the number of random numbers 114 stored by the database 110 is below a threshold. When the number of random numbers 114 stored by the database 110 is below the threshold, the controller unit 134 selects a candidate random number generation apparatus 124. For the candidate random number generation apparatus, the controller unit 134 controls the one or more agitators 148 to stir the fluid, controls the one or more cameras 146 to capture the one or more images, and generates random numbers based on the one or more images captured by the one or more cameras 146. The system 100 causes the database 110 to store the random numbers generated by the candidate random number generation apparatus 124.

Figure 4A:
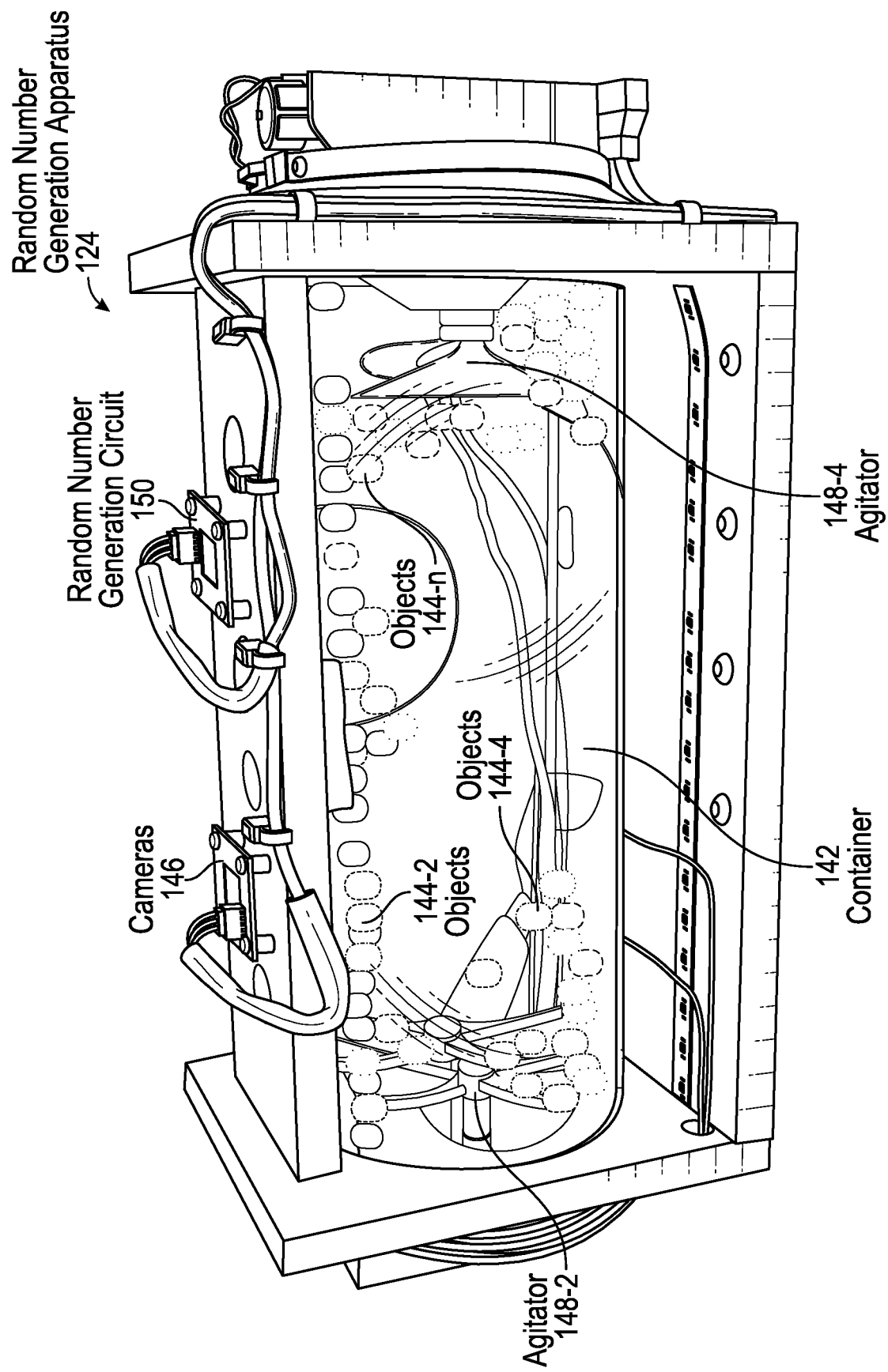
Figure 4B:
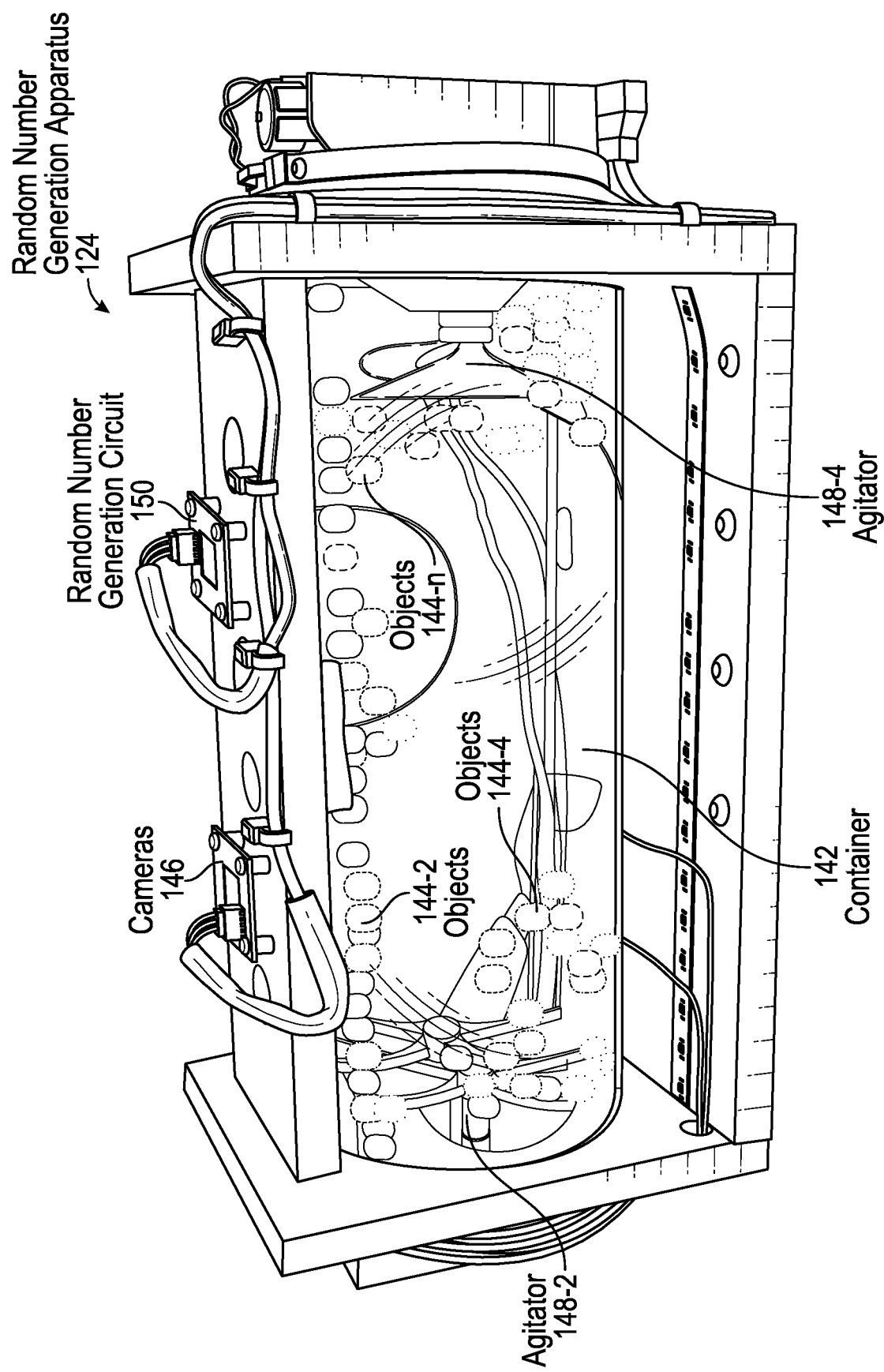
Figure 4C:
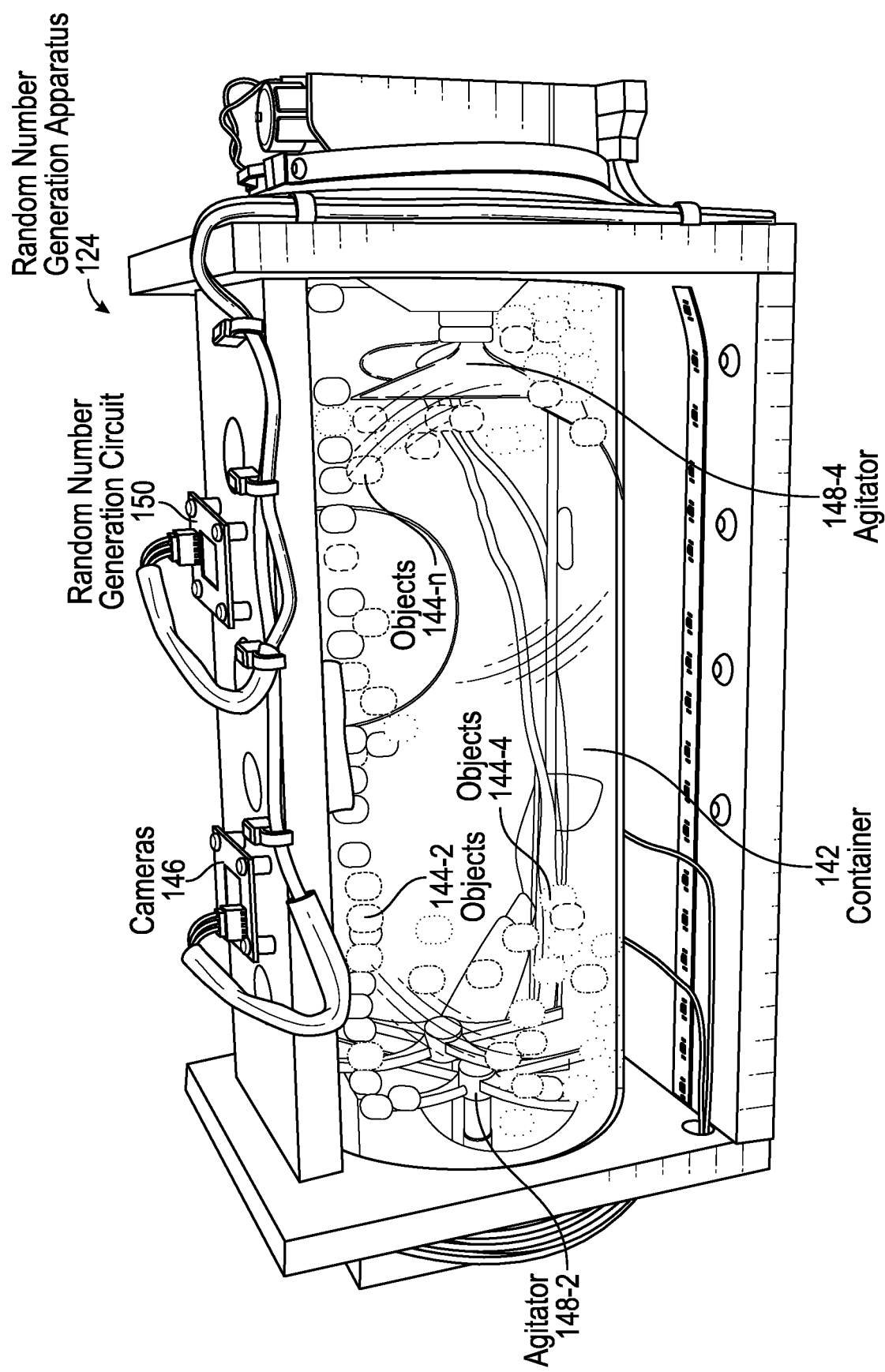

FIGS. 4A-4C and 5A-5D illustrate operation of the example apparatus 124 shown in FIG. 3, according to some embodiments. The apparatus 124 (or a controller attached to the apparatus 124) receives a request for generating one or more random numbers. In response to receiving the request, one or more agitators 148 stir the fluid in the container 142. The container 142 includes one or more objects 144 that are suspended freely in the fluid, so the agitators cause the objects 144 to move freely in the container 142. For example, FIG. 4A shows a state of the container 142 when the first agitator 148-2 is about to start stirring the fluid in the container 142. FIGS. 4B and 4C show states of the container 142 when the agitator 148-2 is rotating at a gradually faster rate. The rotation of the agitator 148-2 (e.g., a fan) causes the fluid around the agitator 148-2 to stir, thereby causing the objects 144 nearby to move freely. Since the objects 144 are not attached to anything, the objects 144 spin or move unpredictably around in the container 142.

Figure 5A:
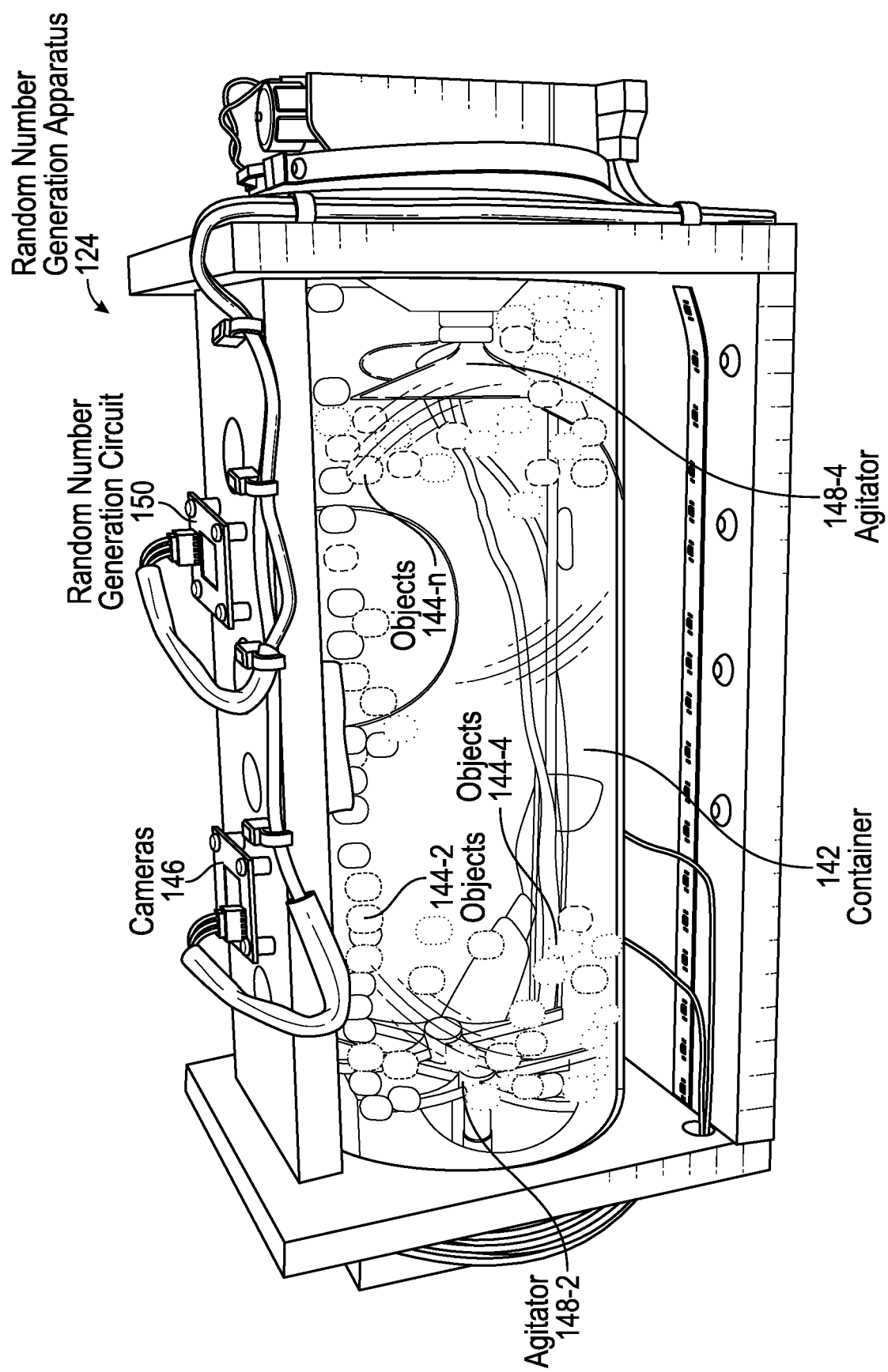
Figure 5B:
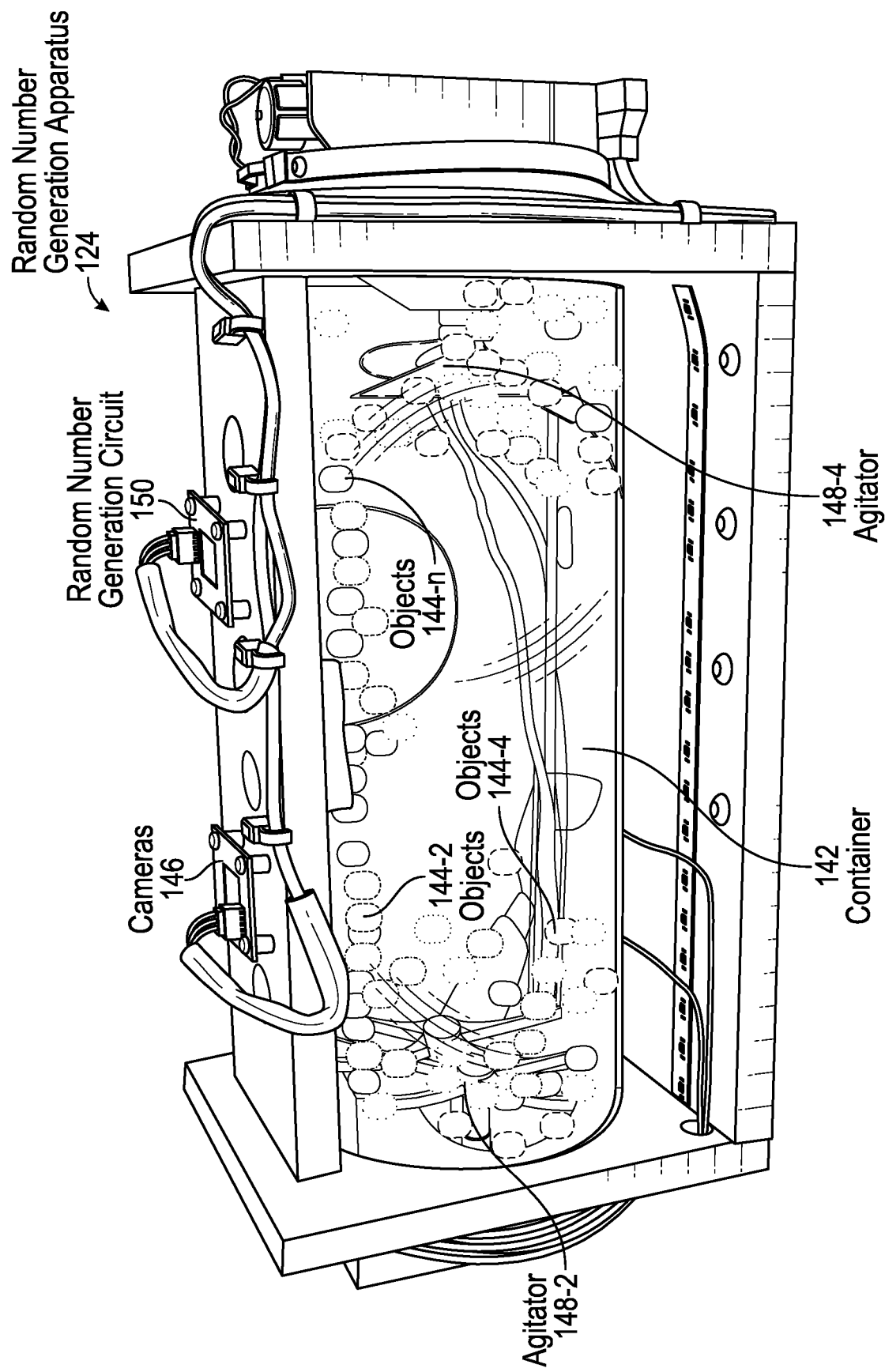
Figure 5D:
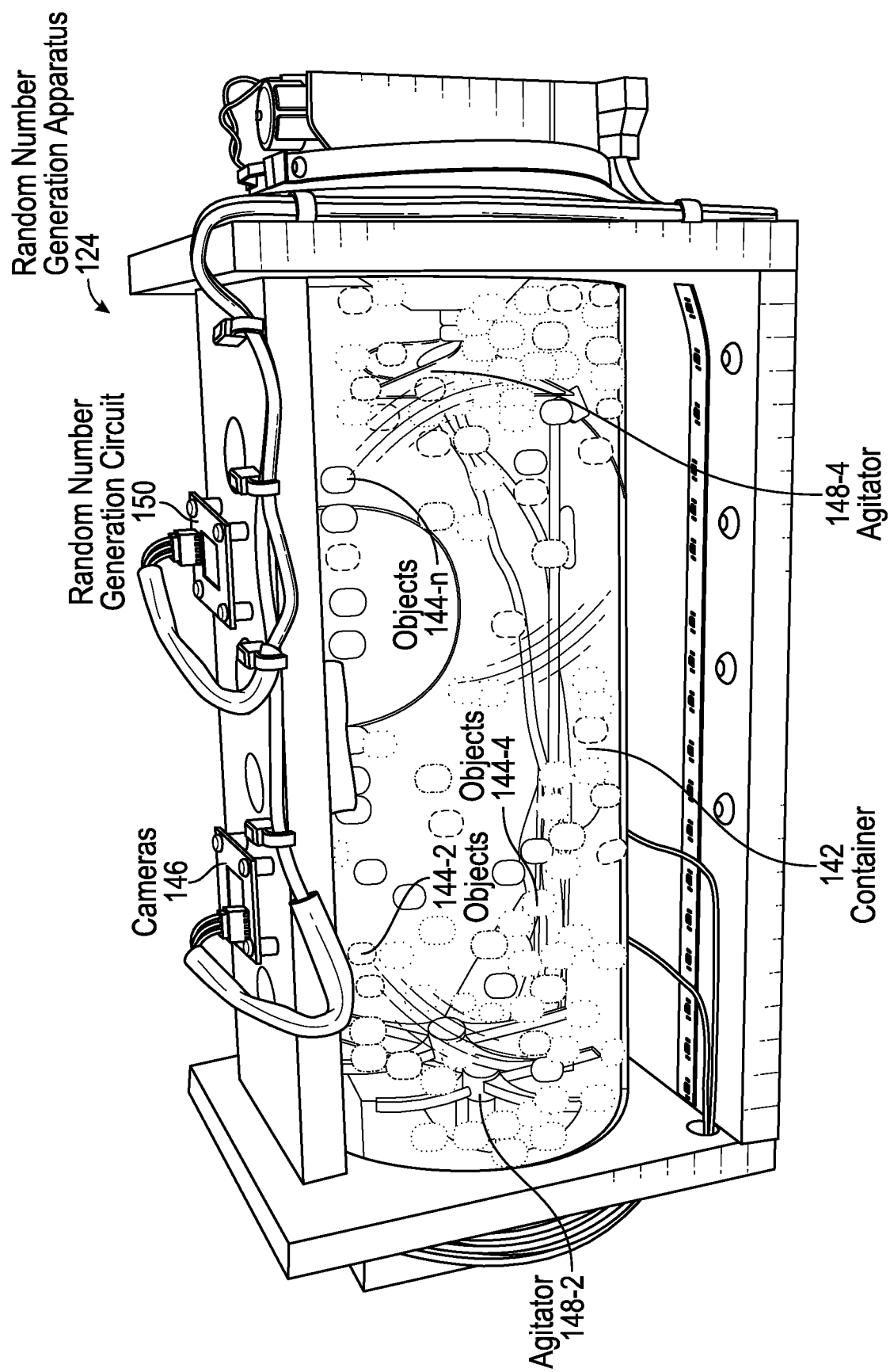

FIGS. 5A-5D show instances or states of the container 142 when the agitator 148-4 continues rotating at a gradually faster rate. The rotation of the agitator 148-4 causes the fluid around the agitator 148-4 to stir, thereby causing the objects 144 nearby to move freely. Since the objects 144 are not attached to anything, the objects 144 spin or move unpredictably around in the container 142. In some embodiments, the agitators rotate or operate independently. In some embodiments, the agitators operate concurrently. FIG. 5D shows a state of the container 142 after the agitators 148-2 and 148-4 rotated for a period of time reaching a high speed (e.g., 10 revolutions per second) causing maximum turbulence in the fluid in the container 142.

Figure 6B:
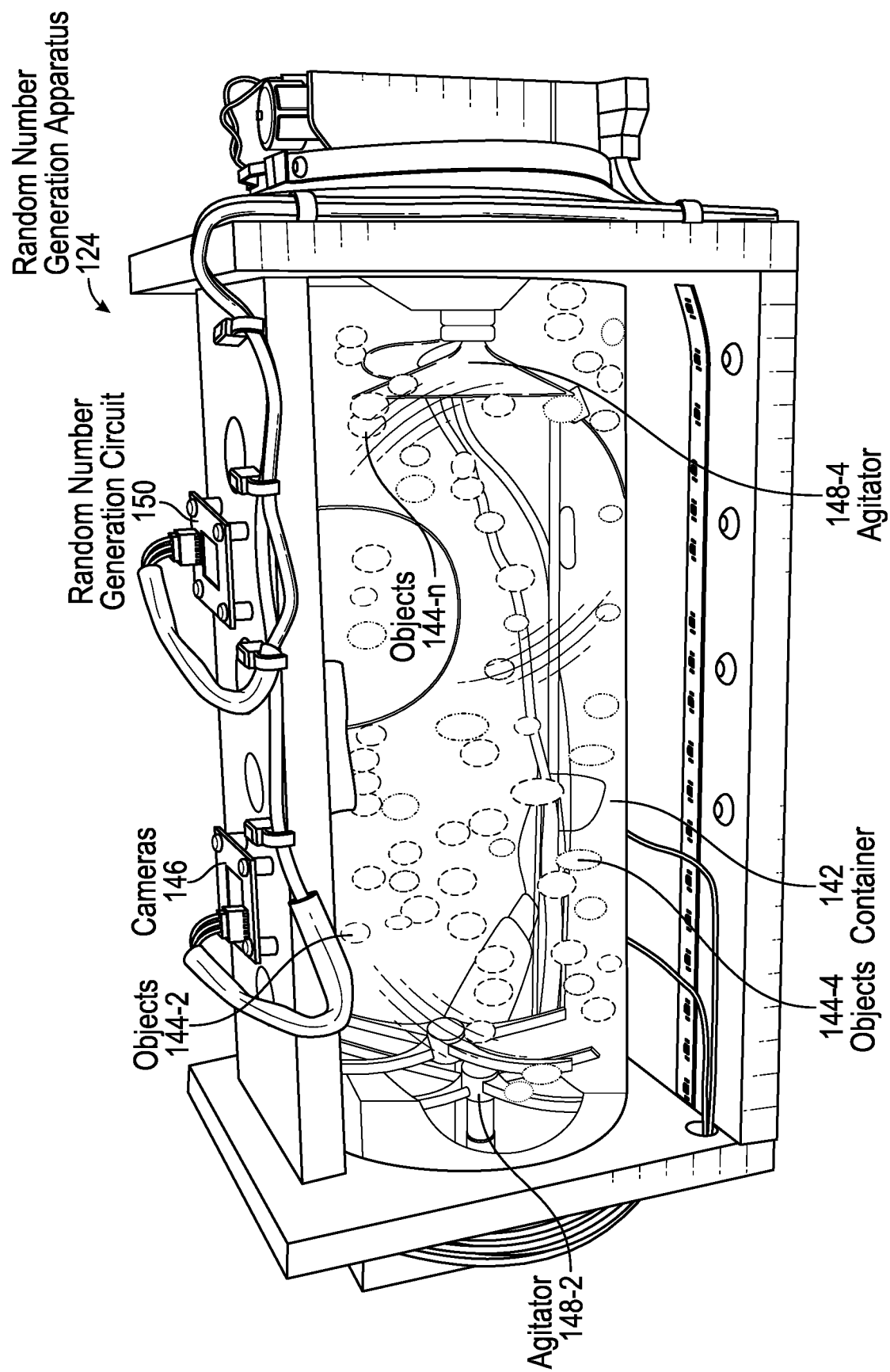
Figure 6C:
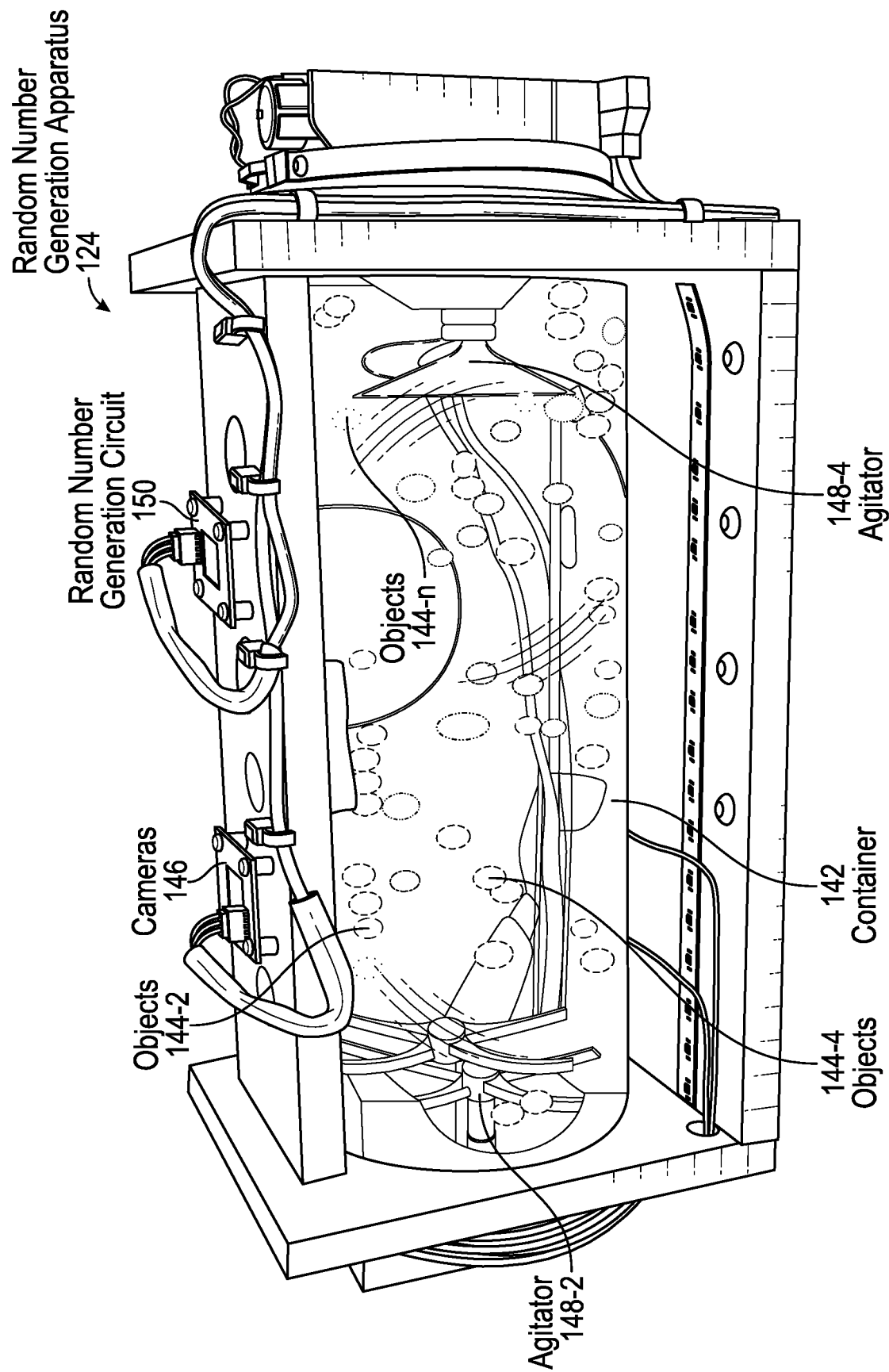

FIG. 6A shows an instance or state of the container 142 when the agitators 148 have finished operation (e.g., the agitators are coming to a gradual halt). As shown in FIGS. 6B and 6C, the fluid in the container 142 gradually settles, causing the turbulence to cease gradually. The one or more objects 144 also gradually come to a less perturbed state.

One or more cameras 146 capture one or more images of the one or more objects 144. In some embodiments, the cameras 146 are high-speed cameras that are configured to capture images during operation of the agitators 148. In some embodiments, the cameras 146 operate after a predetermined period of time (e.g., 1-2 seconds) after the agitators 148 stop stirring the fluid.

Based on the images captured by the cameras 146, the random number generation circuit 150 generates one or more random numbers (e.g., blocks of bits) and stores or provides the random numbers (e.g. using the entropy cache 114 in the database 110). In some embodiments, each generation step creates a large quantity of random numbers. For example, the generation step may create thousands of blocks of random bits, where the block size is based on typical usage (e.g., 64-bit blocks, 128-bit blocks, 256-bit blocks, 512-bit blocks, 1024-bit blocks, or a combination of these).

In some embodiments, each object 144 includes one or more physical features. The one or more images captured by one or more cameras 146 include a subset of physical features of the one or more physical features of the one or more objects, and generating the randomized key is further based on detecting the subset of physical features in the one or more images.

In some embodiments, the container 142 includes opposing first and second ends, (e.g., the ends 170-2 and 170-4), and the one or more agitators 148 include a first agitator 148-2 attached to the first end 170-2 and a second agitator 148-4 attached to the second end 170-4. In some embodiments, the first agitator stirs the fluid. Subsequently, the second agitator 148-4 joins the first agitator 148-2 and concurrently stirs the fluid in the container 142.

Example EAAS System

Figure 7:
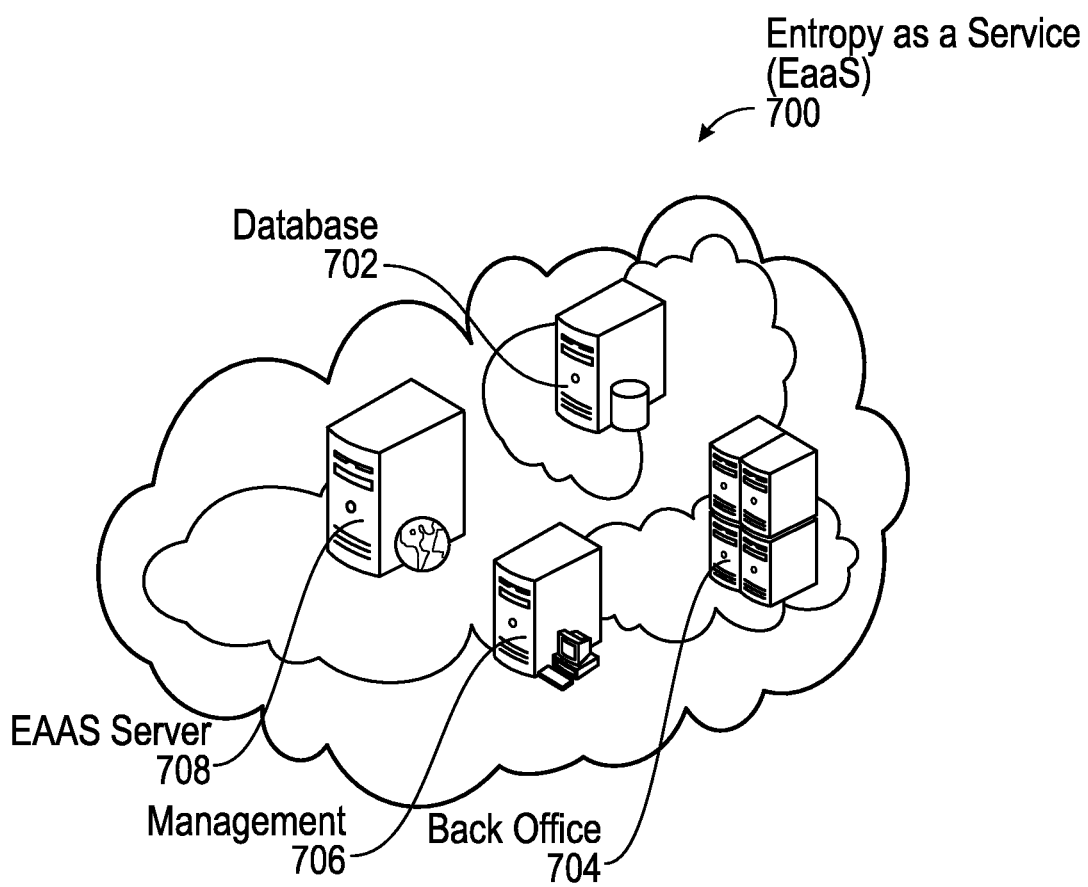
FIG. 7 shows a schematic diagram of an Entropy as a Service (EAAS) system, according to some embodiments.

FIG. 7 shows a schematic diagram of an Entropy as a Service (EAAS) system 700, according to some embodiments. As described above, Entropy As A Service is a source of non-exhaustible, high-quality entropy to consumers using secure methods. EAAS systems can be hosted in the cloud or hosted on premises.

The major components of the EAAS system are an EAAS Server 708 (e.g., a server that provides RESTful and web based interfaces), a database 702 (e.g., a storage of entropy data from providers), and a management server 706 (e.g., a server that provides dashboard and overall control of the EAAS Server). Some embodiments include a back office server 704. In some embodiments, the database 702, the back office 704, and the EAAS server correspond to the database 110 and server system 130 described above in FIGS. 1 and 2.

The EAAS server 708 provides the web oriented interfaces to content publishers and consumers. A content publisher is an entity that publishes entropy for later consumption. A consumer is someone who requests entropy data of a certain length (e.g., 256-bit entropy). In some embodiments, these transactions use conventional GET and POST HTTP verbs over SSL/TLS. Some embodiments do not support non-encrypted access. In other words, clients must be authenticated in order to publish or consume entropy. In some embodiments, entropy is only supplied once to a consumer. That is, once the entropy has been taken out of the database for use, no further record of it is kept in the database 702 (the entropy is designated as single-use). There is no replay capability. Once entropy has been sent to a consumer, it no longer exists in the EAAS database 702.

Figure 8:
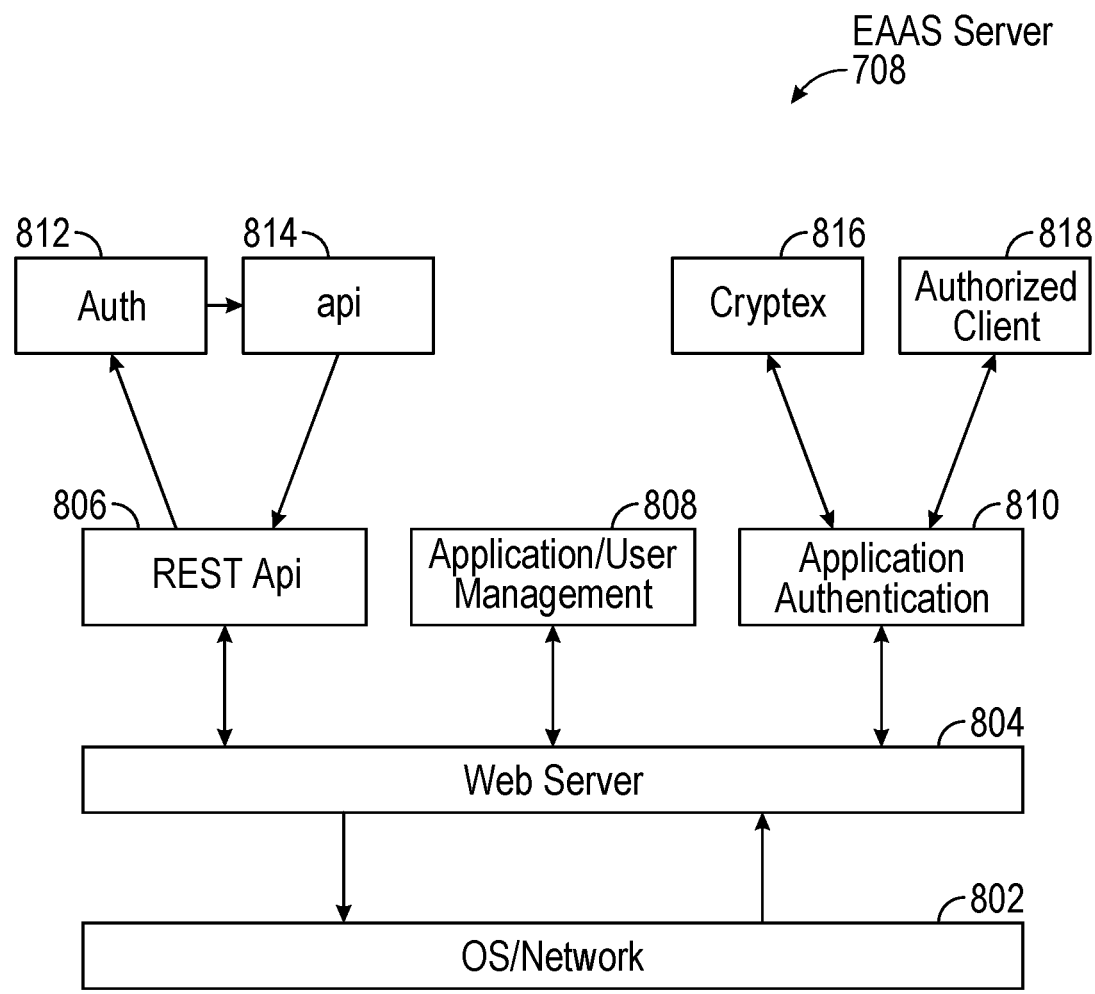
FIG. 8 shows an architectural diagram of EAAS server, according to some embodiments.

FIG. 8 shows a block diagram of an example EAAS server 708, according to some embodiments. The example shows the major functional blocks, according to some embodiments. There are at least three distinct functions provided by the EAAS server 708, according to some embodiments. A REST Api 806 module uses OAuth (or OAuth2) 812 for authentication and access control. The REST Api 806 provides an interface to allow entropy publishers to provide entropy for later consumption, and an interface to allow entropy consumers to consume entropy. In some embodiments, each application must be registered and is issued an application identifier and a secret key. An Application/User Management module 808 provides operator control of applications and users that are allowed to access the EAAS server 708. In some embodiments, this facility is provided as a web based dashboard with different views of applications and users. An Application Authentication module 810 provides access control and session control to built-in applications, supports multi-factor authentication, and/or audit logging. The REST Api 806 receives results of the authentication module 812 via an api module 814, according to some embodiments. The Application authentication module 810 interfaces with a Cryptex module 816 (described below) and an authorized client 818. According to some embodiments, the EAAS server 708 includes a web server 804 that uses various OS and network services 802. In some embodiments, the web server 804 interfaces with the REST Api 806, the Application/User Management module 808, and the Application Authentication module 810, to service web requests.

Referring now back to FIG. 7, the database server 702 is an expandable server configured to store and get entropy data for the EAAS server 708, according to some embodiments. In some embodiments, the database server 702 is a large scale commercial database engine (e.g., an SQL database engine), which can handle many simultaneous transactions and supports database clustering. In some embodiments, the database server 702 is secured to prevent direct external access.

In some embodiments, the EAAS server 708 uses a relational database that provides one or more tables. In some embodiments, the one or more tables include an API table, which identifies applications, entropy (published entropy data), and/or sources (entropy sources). In some embodiments, the one or more tables include authentication and authorization information, which specifies groups (access control) and/or users (authorized users). In some embodiments, the one or more tables include a password management application (sometimes called Cryptex), which includes invalid passwords (e.g., a list of invalid passwords not to be allowed), and/or vaults (password vaults). In some embodiments, the one or more tables include OAUTH information, which identifies issued access tokens, registered applications, issued grants, and/or issued refresh tokens.

Figure 16:
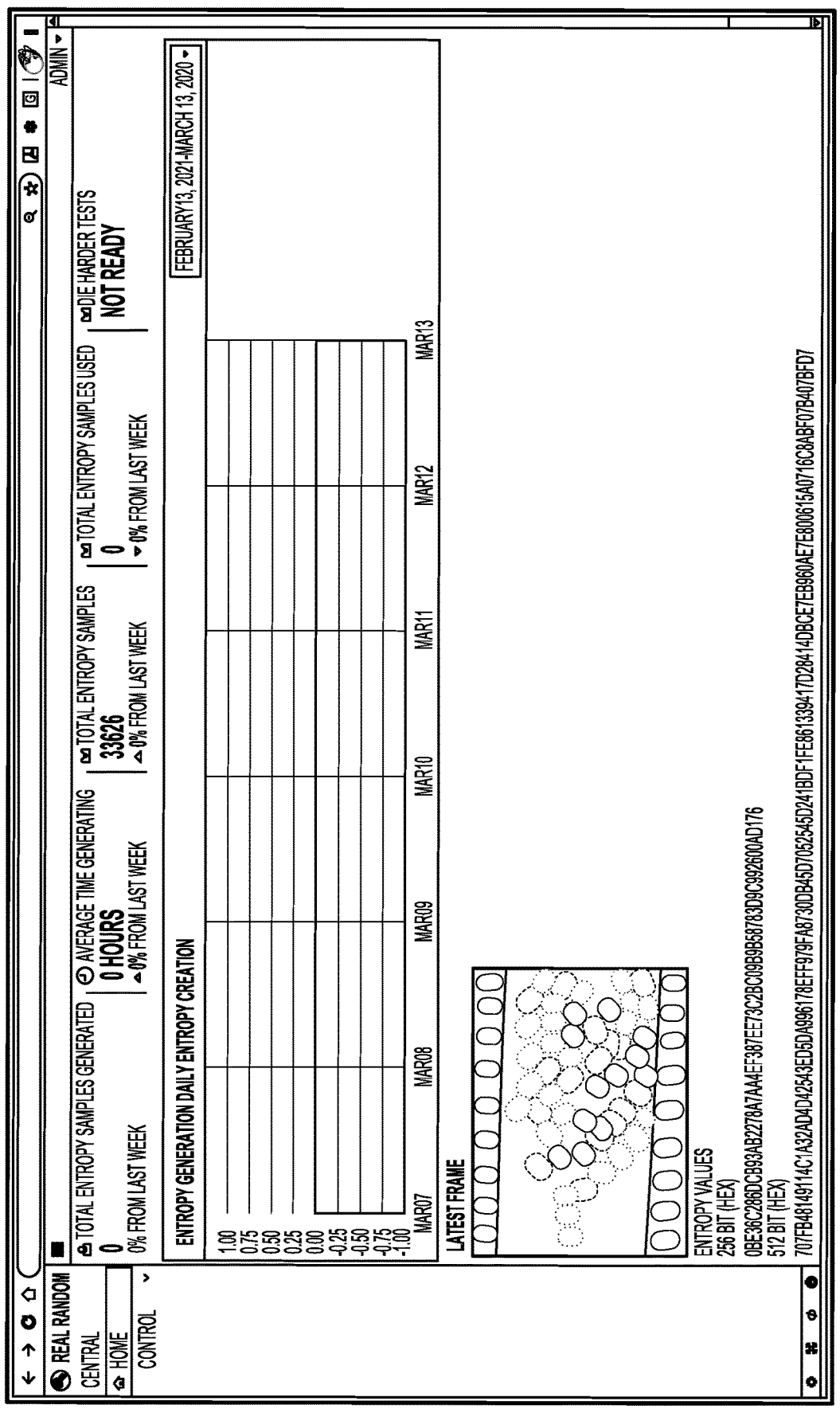
FIG. 16 illustrates a dashboard used to monitor the generation of random numbers in accordance with some embodiments.

In some embodiments, the management server 706 provides a dashboard view of the EAAS server 708 and general user account management. In some embodiments, the dashboard provides one or more views that specify the amount of stored entropy (e.g., the inventory of available entropy), the number of publish transactions per second, the number of entropy requests per second, the number of active concurrent users, the average size of entropy requests, trend graphs, alerts (e.g., low inventory of entropy, low disk space, uptime, login failures, user management, account creation, account suspension, and/or account removal), the activity log, and/or continuous health check or test (e.g., similar to a NIST health check). In some embodiments, a separate dashboard (e.g., a user dashboard) is provided to end users to manage their accounts. See FIG. 16.

In some embodiments, the back office server 704 handles gathering statistics and billing for clients, based on pricing models and techniques. In some embodiments, the tasks include overage assessment, invoicing, and/or credit card processing.

Entropy Publisher

A publisher is a provider of entropy to the EAAS server 708. In some embodiments, there is no limit to the number of publishers. Each publisher provides entropy using the EAAS Rest API 806. In some embodiments, this API requires that each publisher is known to the EAAS server 708 and that each publisher has a client id and client secret, and authenticates using OAUTH2. In some embodiments, it is up to the publisher to protect the client id and client secret. In some embodiments, all publishing is done over SSL/TLS. In some embodiments, the minimum information required for each transaction includes the size or the number of bits of entropy being published, and the entropy data (e.g., 8 bit bytes, encoded in base64). In some embodiments, this information is serialized using JSON and published using a HTTP POST operation.

Some embodiments provide a stand-alone product for publishing entropy (sometimes called Zentropy Publisher). In some embodiments, the product is treated as a black box and the EAAS server 708 has no knowledge of its internal operations. In some embodiments, it is a known application (described above), and uses the REST API 806 to publish entropy.

Entropy Consumer

An entropy consumer is an application that may request entropy from the EAAS server 708. In some embodiments, in order for a consumer to retrieve entropy, the consumer must first authenticate itself to the EAAS server 708, to establish a session. Then, using the session, the consumer may request entropy of various lengths. In some embodiments, entropy data is returned as JSON encoded data with the following fields: a timestamp, a size (e.g., the number of bits of data), the data (e.g., base64 encoded entropy data), and/or an optional signature (e.g., a digital signature for entropy).

Example Secure Password Manager

Some embodiments provide a secure password manager 900 (sometimes called Cryptex) as an application to handle password storage (e.g., on a per-user basis). Some embodiments create passwords using entropy from the EAAS server 708. In some embodiments, the password manager is a client side application utilizing a set of web based requests to perform user management, random password creation, and/or storage of passwords for different applications.

Figure 9:
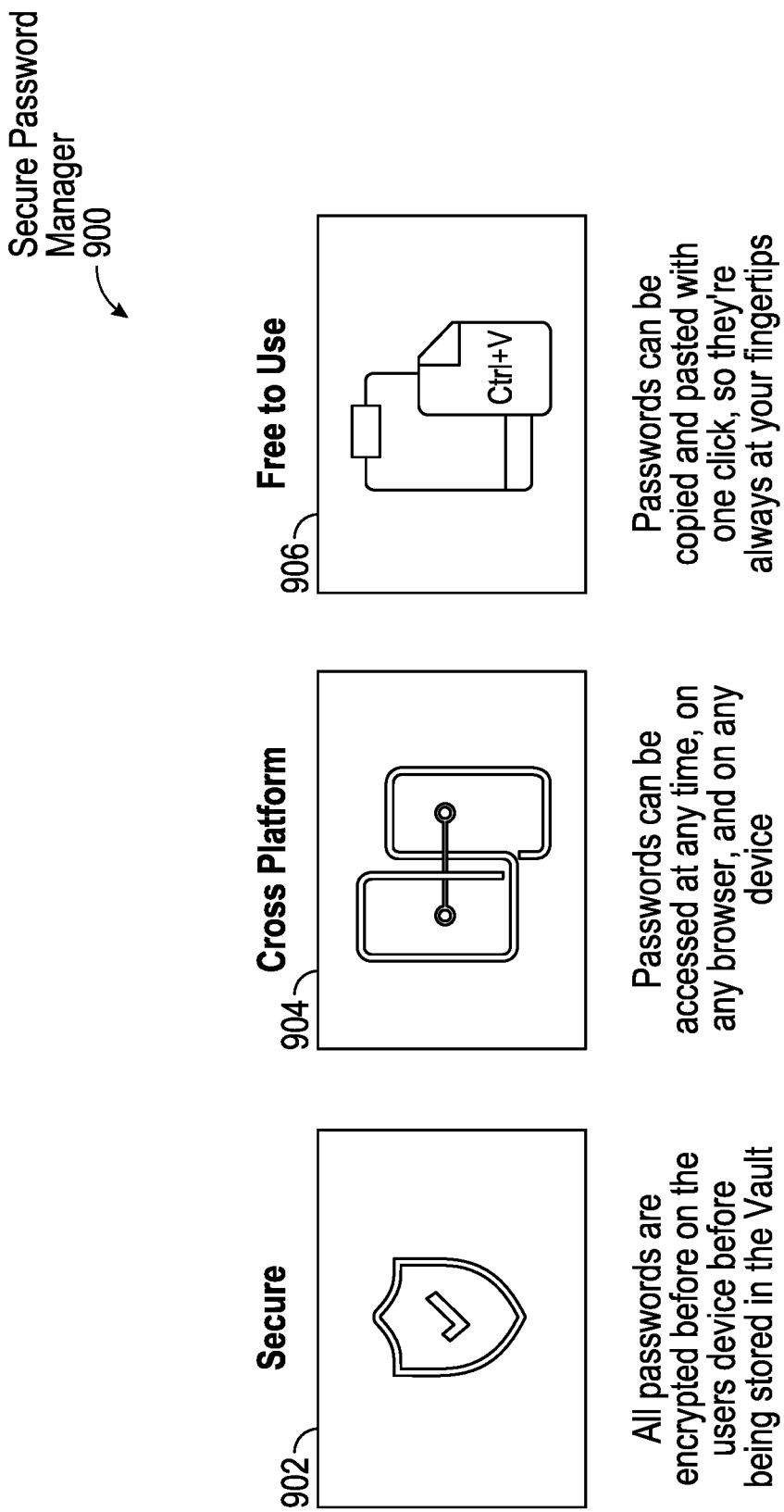
FIG. 9 illustrates various aspects of a secure password manager, according to some embodiments.

FIG. 9 illustrates various aspects of an example secure password manager 900, according to some embodiments. In some embodiments, the password manager 900 is secure (902). For example, all passwords are encrypted before on the users device before being stored in a vault. In some embodiments, the password manager 900 is cross-platform (904). For example, passwords can be accessed at any time, on any browser, and on any device. In some embodiments, the password manager 900 is free to use (906). For example, passwords can be copied and pasted with one click, so the passwords are always at a user's fingertips.

Figure 10A:
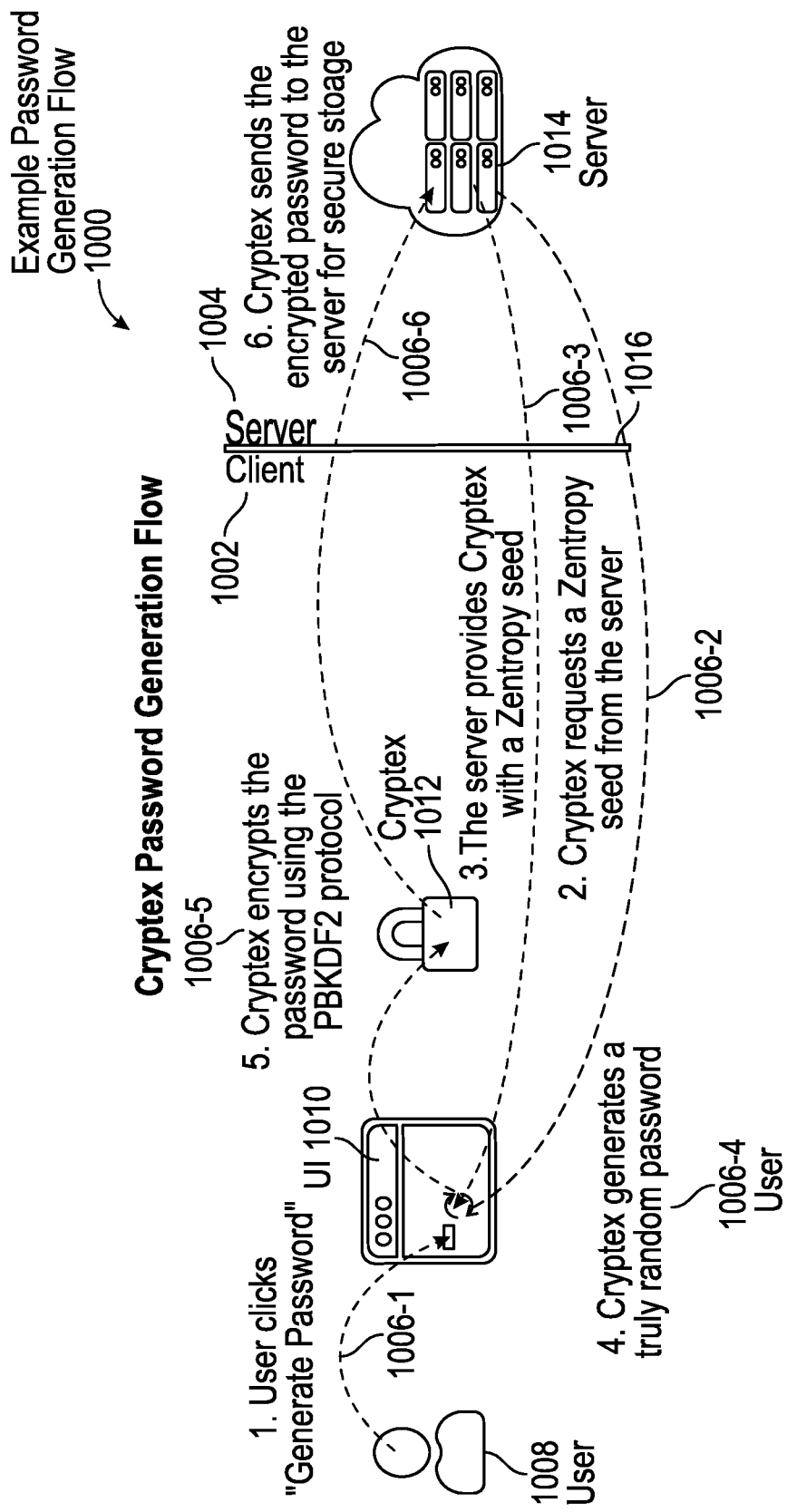
FIG. 10A shows an example password generation flow, according to some embodiments.

FIG. 10A shows an example password generation flow 1000, according to some embodiments. A user 1008 clicks (1006-1) a "generate password" affordance on an user interface (UI) 1010. This prompts a password manager 1012 (e.g., the manager 900) to request (1006-2) an entropy seed (sometimes called Zentropy seed) from an entropy server 1014 (e.g., the server 708). The server 1014 provides (1006-3) the password manager 1012 with a seed value. Based on the seed value, the password manager 1012 generates (1006-4) a truly random password. The password manager 1012 encrypts (1006-5) the password using the PBKDF2 protocol (or other encryption protocol), and sends (1006-6) the encrypted password to the server 1014 for secure storage. In some embodiments, as indicated by the line 1016, tasks related to the password generation flow 1000 are split between a client 1002 (e.g., the password manager 1012), and a server 1004 (e.g., the server 1014).

The Cryptex system is secure: Cryptex 2FA uses a QR code to pair a mobile device with web applications, ensuring that only a single, air-gapped connection ever occurs between the application and the mobile device. Any data that Cryptex 2FA stores on the mobile device is encrypted prior to storage to safeguard the data.

The Cryptex system is also easy to use. Setting up Cryptex 2FA on an account is straightforward and only takes a few seconds. When a user wants to log into an account that is protected by Cryptex 2FA, the user just opens up the Cryptex 2FA application on the mobile device, selects the desired account for authentication, and types the six digit code that is displayed in the Cryptex 2FA application when prompted.

Figure 10B:
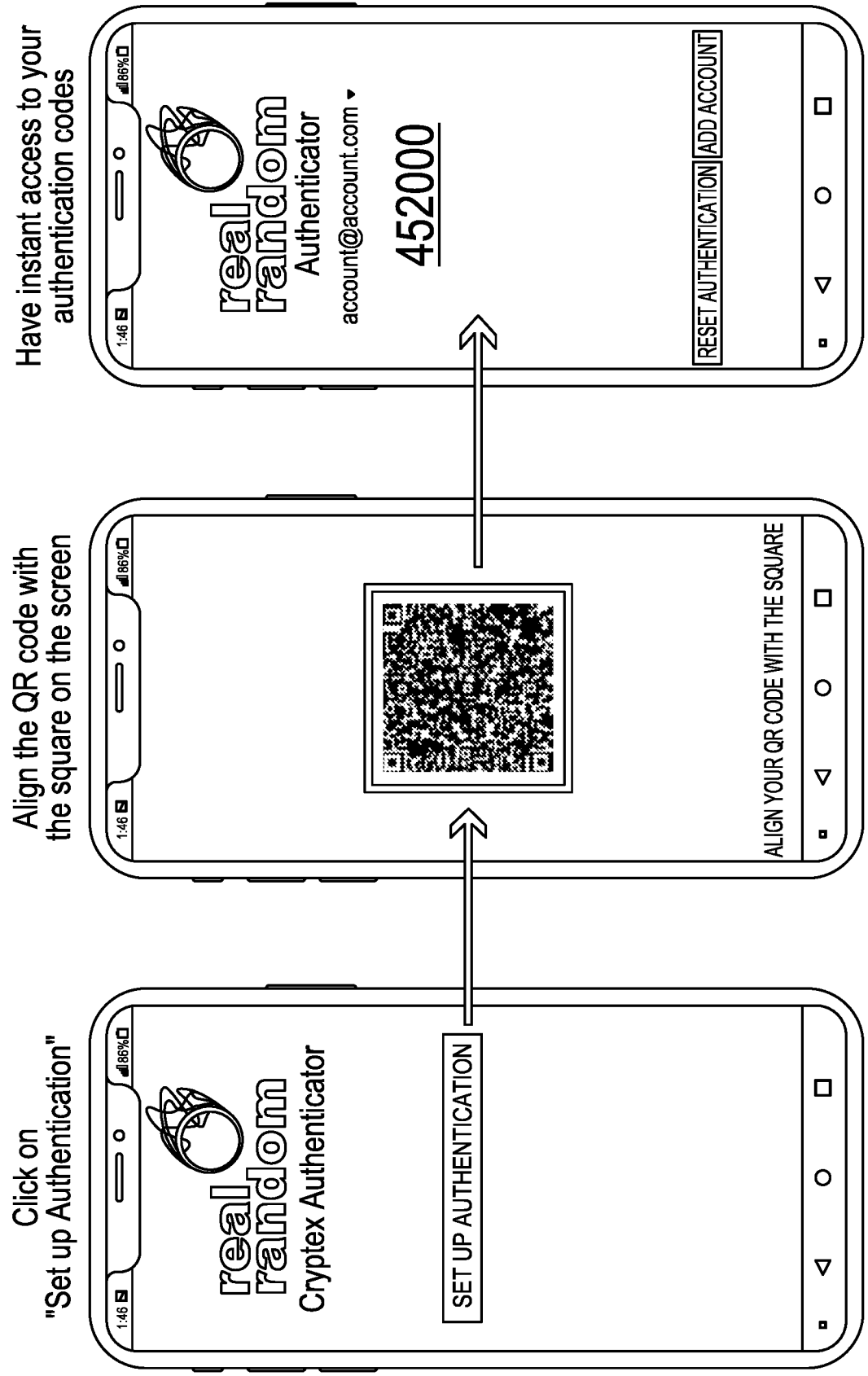
FIG. 10B illustrates the use of an authentication module according to some embodiments.

FIG. 10B illustrates the usage of the Cryptex authenticator.

Some embodiments provide a facility (e.g., an EAAS bucket) to request large amounts of entropy in a single transaction, and to store the results in a file on a local file system.

EAAS OpenSSL

Figure 11:
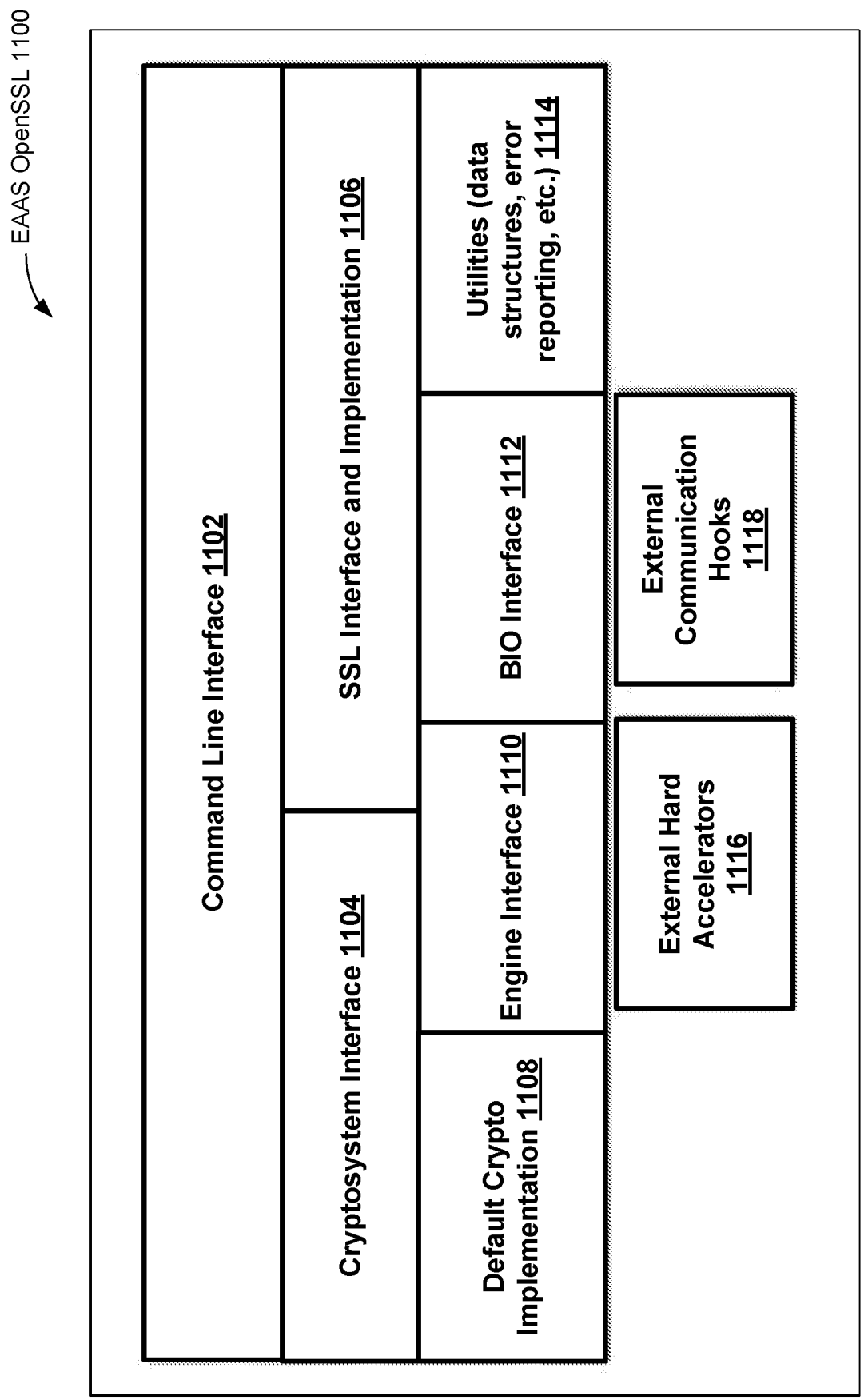
FIG. 11 shows an architectural diagram of EAAS OpenSSL system, according to some embodiments.

EAAS OpenSSL provides entropy to OpenSSL via a loadable OpenSSL extension that communicates with the EAAS Server to request entropy using high level commands contained in OpenSSL. An example architecture of EAAS OpenSSL 1100 is shown in FIG. 11, according to some embodiments. In some embodiments, EAAS OpenSSL is an external hardware accelerator in the OpenSSL architecture. In some embodiments, there are two distinct configurations for EAAS OpenSSL: (1) a dedicated configuration (e.g., single application has a dedicated connection and an entropy pool), and (2) a shared configuration in which each application uses a shared entropy pool via a local agent.

In some embodiments, the EAAS OpenSSL 1100 architecture includes a command line interface 1102, which accepts user commands. In some embodiments, the architecture 1100 also includes a cryptosystem interface 1104, such as an envelope (EVP) interface, which supports the ability to perform authenticated encryption and decryption and/or the option to attach unencrypted, associated data to a message. In some embodiments, the cryptosystem interface 1104 provides functions used to perform various cryptographic operations. In some embodiments, the architecture 1100 includes an SSL interface 1106, a default crypto implementation 1108, an engine interface 1110, a BIO interface 1112 (e.g., interfaces that support biometric encryption/decryption), and utilities 1114 (e.g., data structures and error reporting). Some embodiments include external hardware accelerators 1116 and/or an external communication API 1118 (e.g., interfaces or hooks).

Figure 12:
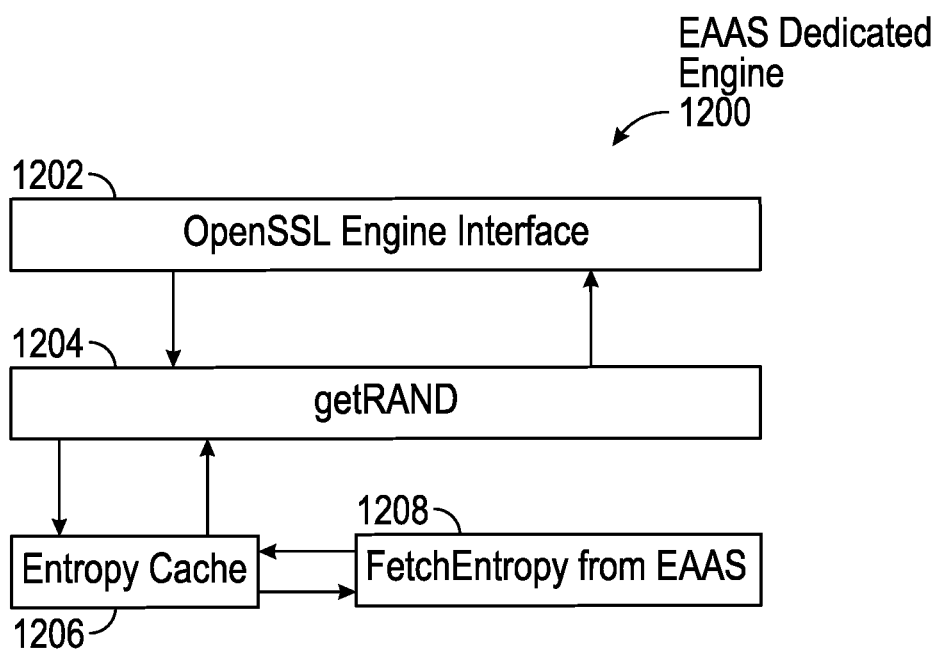
FIG. 12 shows an architectural diagram of EAAS dedicated engine, according to some embodiments.

FIG. 12 shows an architectural diagram of an example EAAS dedicated engine 1200, according to some embodiments. In some embodiments, the EAAS engine 1200 is initially provisioned with a block of entropy that would allow the EAAS engine 1200 to service local requests. For example, the block of entropy includes enough entropy to use to communicate to the EAAS server 708 in order to retrieve the next block of entropy. In some embodiments, an entropy cache 1206 provides entropy and the FetchEntropy function 1208 monitors the cache 1206, refilling the cache 1206 when the entropy in the cache drops below a predetermined threshold (e.g., 50% of its capacity). Some embodiments support a getRand( ) function 1204, which is called to return random numbers from the entropy cache 1206. In some embodiments, an OpenSSL engine interface 1202 uses the getRand( ) function to return random numbers to entropy consumers.

Figure 13:
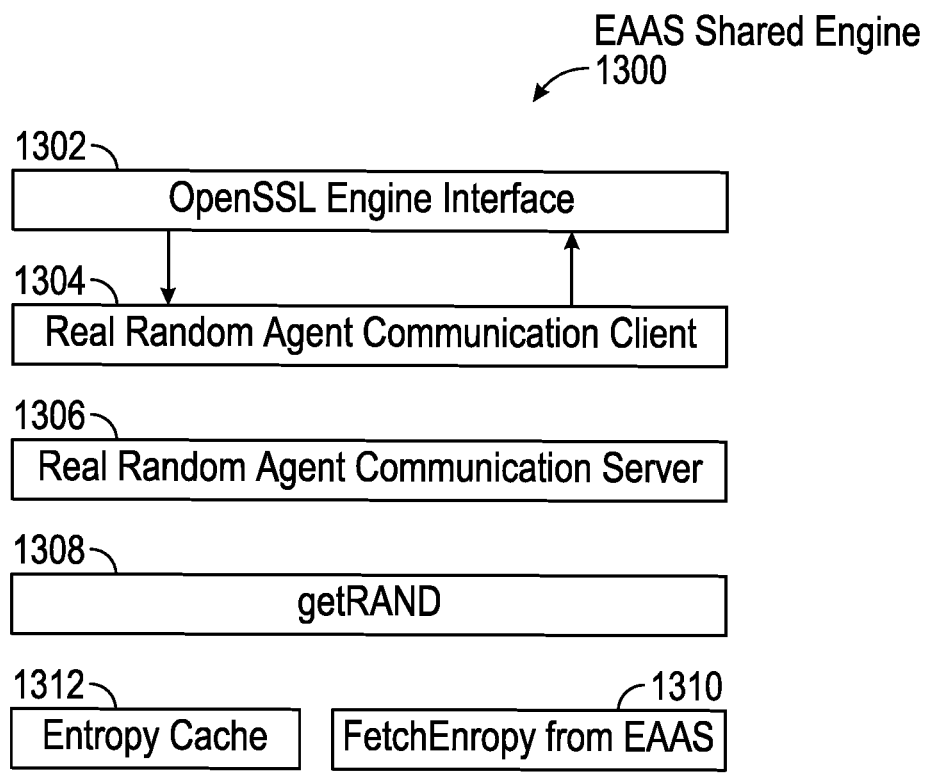
FIG. 13 shows an architectural diagram of EAAS shared engine, according to some embodiments.

FIG. 13 shows an architectural diagram of an example EAAS shared engine 1300, according to some embodiments. In some embodiments, the shared engine 1300 communicates with an agent (e.g., an agent implemented using a client 1304 and a server 1306) running on the local system that is responsible for multiplexing entropy across different clients. In some embodiments, the agent operates almost identically to the dedicated engine 1200 (e.g., it uses getRand( ) function 1308). In some embodiments, the engine 1300 stores a block of entropy in the entropy cache 1312, similar to the dedicated engine 1200, and continually refills the cache 1312 using calls to the FetchEntropy function 1310 from an EAAS server (e.g., the EAAS server 708) as entropy is consumed.

Figure 14:
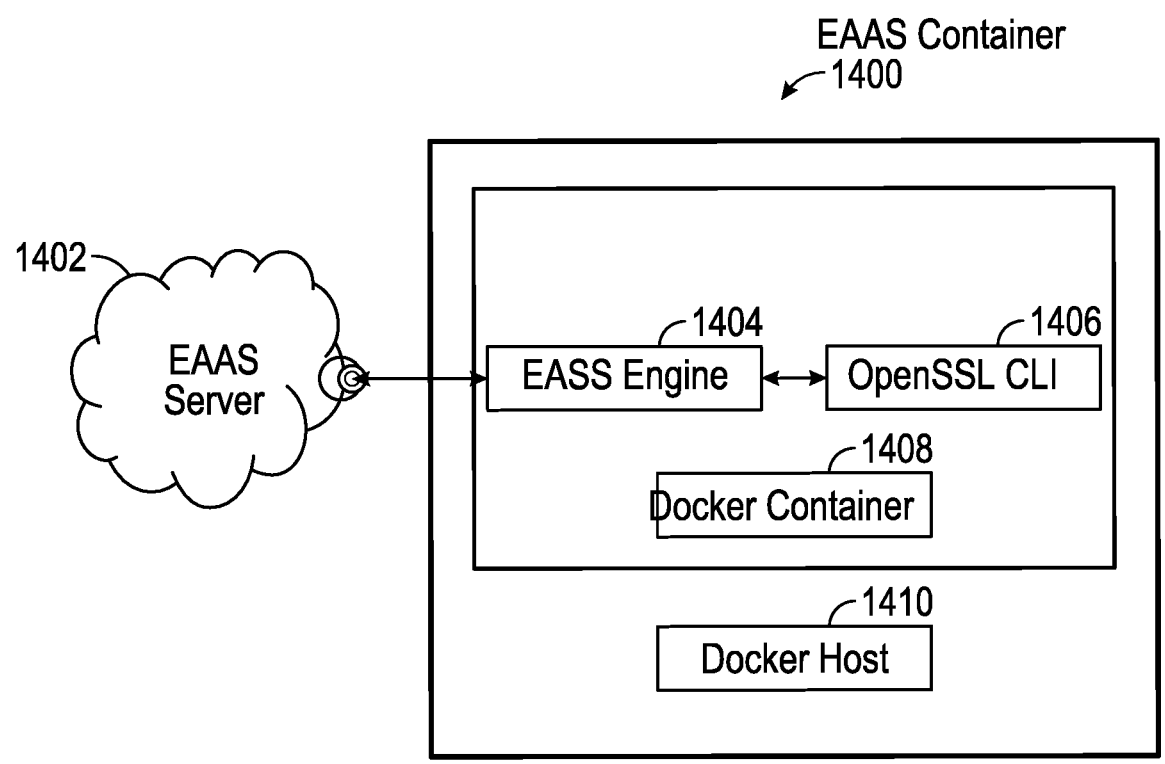
FIG. 14 shows an architectural diagram of EAAS container, according to some embodiments.

FIG. 14 shows an architectural diagram of an example EAAS container 1400, according to some embodiments. In some embodiments, the EAAS container 1400 is a microcontainer to provide entropy to other containers. In some embodiments, the container provides an OpenSSL command line interface (CLI) 1406 for other containers or micro-containers to use for retrieving high quality entropy. In some embodiments, the EAAS container 1400 leverages and builds upon the EAAS OpenSSL engine 1100 (indicated as the EAAS engine 1404). For example, a docker container 1408 (in a docker host 1410) that requires entropy (from an EAAS server 1402, such as the server 708) can use this model directly. Additionally, this model can be used to seed the Linux PRNG that is included with the Linux Operating System.

Cryptographic Key Creation, Backup, and Recovery

Figure 15:
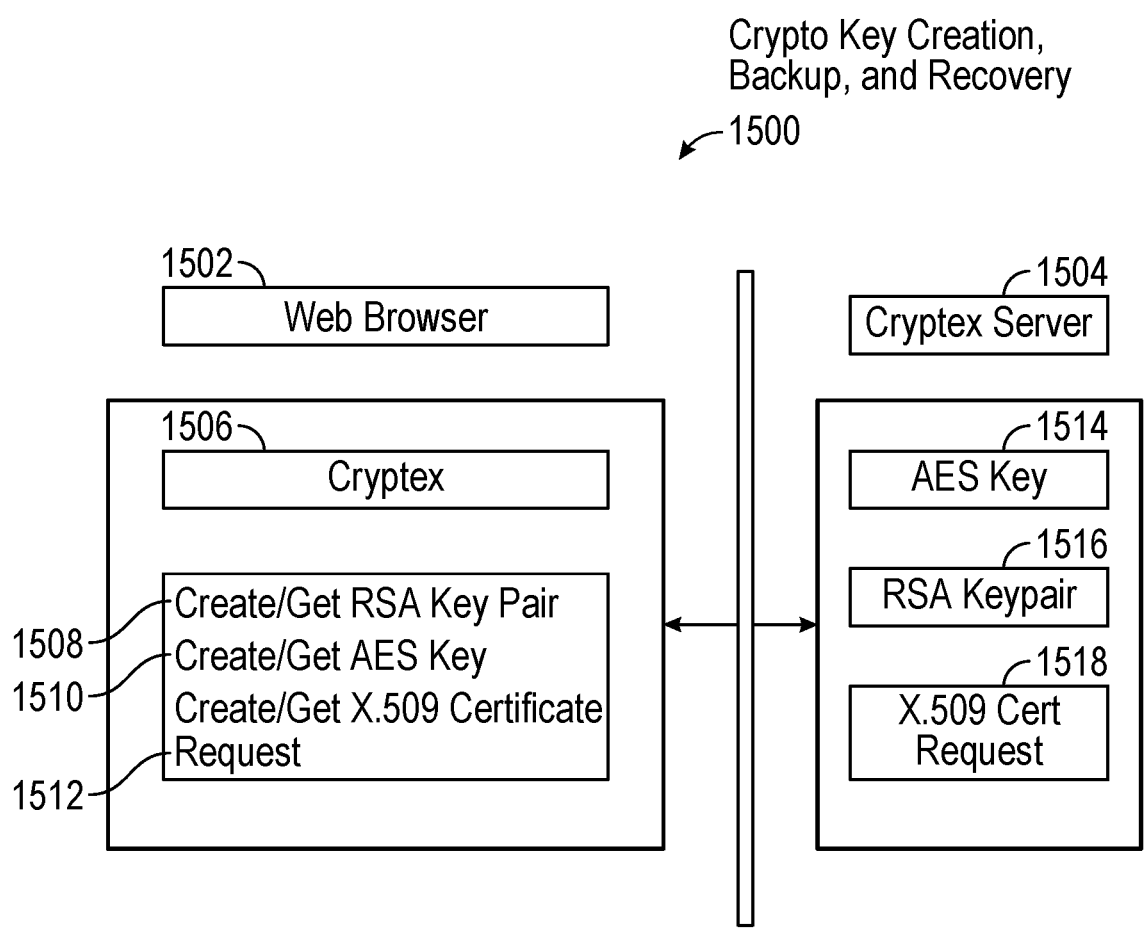
FIG. 15 shows an architectural diagram of crypto key creation, back-up, and recovery, according to some embodiments.

FIG. 15 shows an example architectural diagram of crypto key creation, back-up and recovery 1500, according to some embodiments. When using private keys, best practices recommend that the keys are backed up so that in the event of disaster recovery, the keys can be recovered. Certificate Authorities do not provide this facility and one has to use either ad-hoc or other methods to save keys and certificate requests. TPM, for example, provides hardware storage of the private key and the private key cannot be exported, therefore backup of a user's private key is necessary for disaster recovery. By having a central facility to create and manage crypto keys, significant time and expense can be saved. High quality keys are generated using the entropy created by EAAS.

In some embodiments, the example architecture shown in FIG. 15 generates (e.g., using the server 1504) secure keys (e.g., RSA key pairs 1516 and AES keys 1514) for cryptographic operations. For example, the Cryptex server 1504 can respond to requests via a web browser 1502, from a client, such as Cryptex 1506, to create or get (1508) an RSA key pair 1516, to request or get (1510) an AES key 1514, or to request or get (1512) an X.509 certificate 1518. This includes building certificate requests (e.g., X.509 certificate requests 1518) and secure storage of the keys for later reuse or recovery. Some embodiments create RSA keys to be used for TLS, signing, authorization, and similar other uses. In some embodiments, keys are managed through an application (e.g., the Cryptex application described above). In some embodiments, RSA Keys are delivered in PKCS #12 format password protected using a Cryptex Password. In some embodiments, keys use the entropy server 708 as a random source to create the keys. In some embodiments, AES Keys of length 128, 192, and 256 are returned as Base64 encoded strings. In some embodiments, the keys can be easily downloaded to a file or placed into a copy buffer. In some embodiments, when creating a certificate request, the required information about the certificate is also saved in the vault, so that when renewing the certificate, all of the same information will be used.

Figure 17:
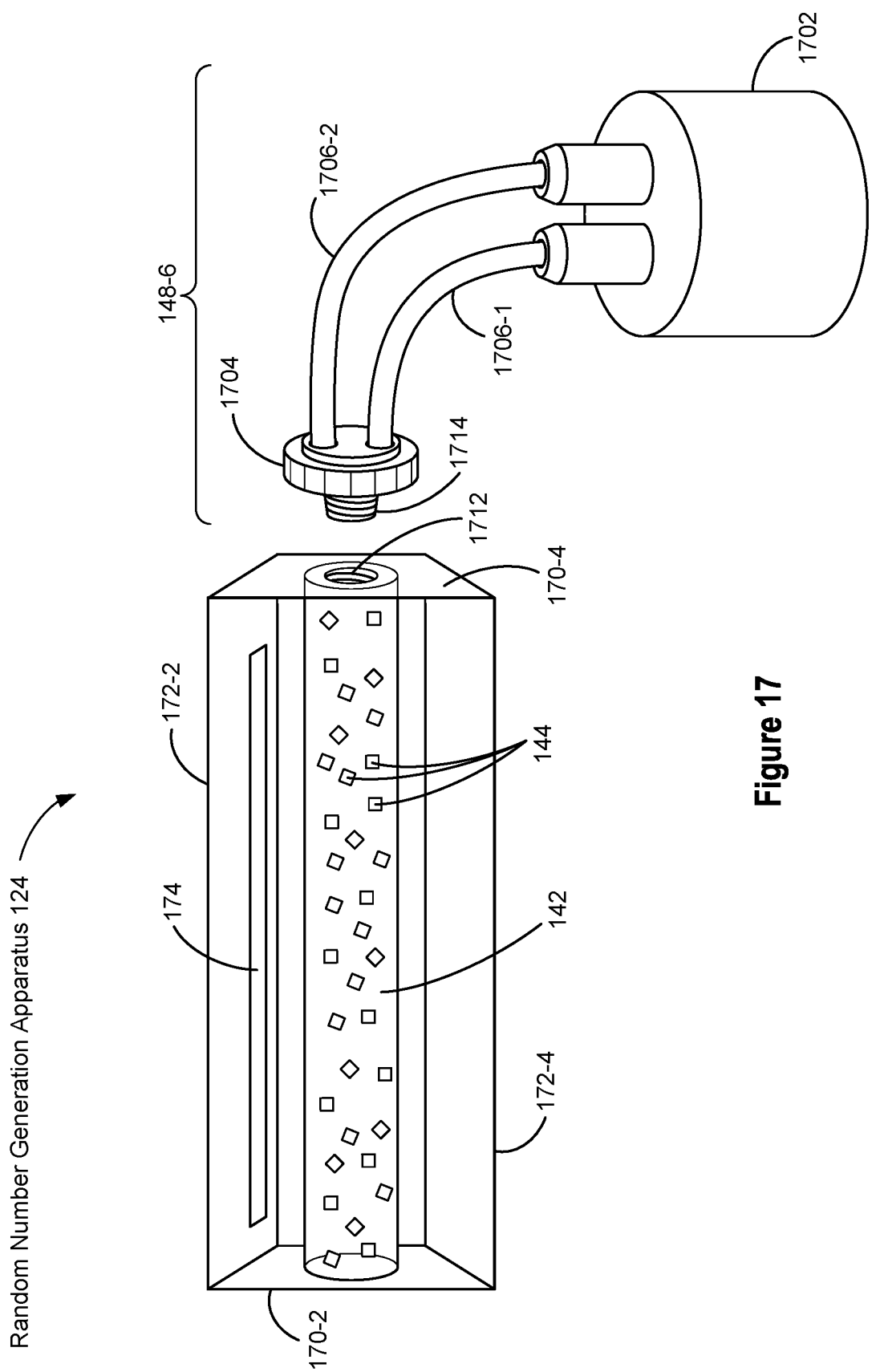
FIGS. 17-19 illustrate another example apparatus for generating truly random numbers, according to some embodiments.
Figure 18:
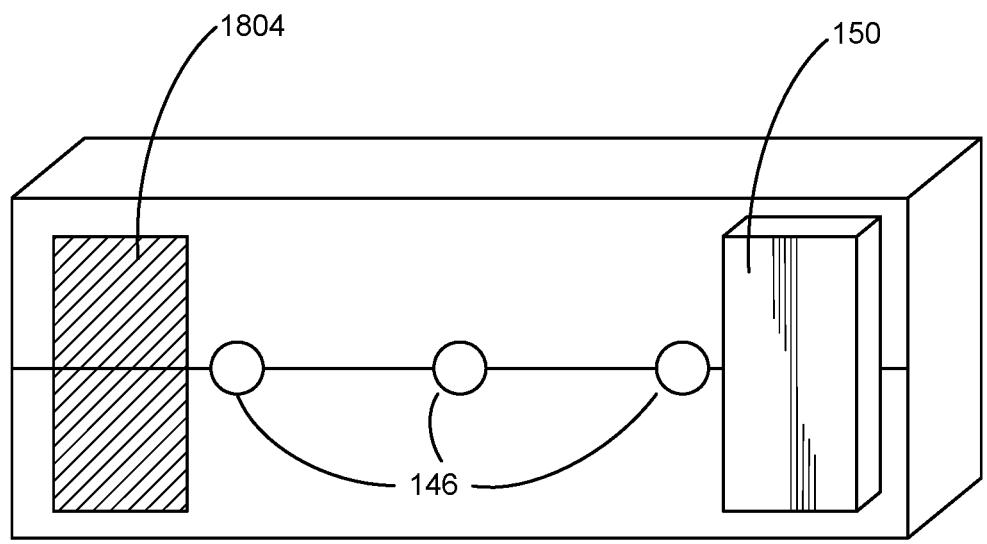
Figure 19:
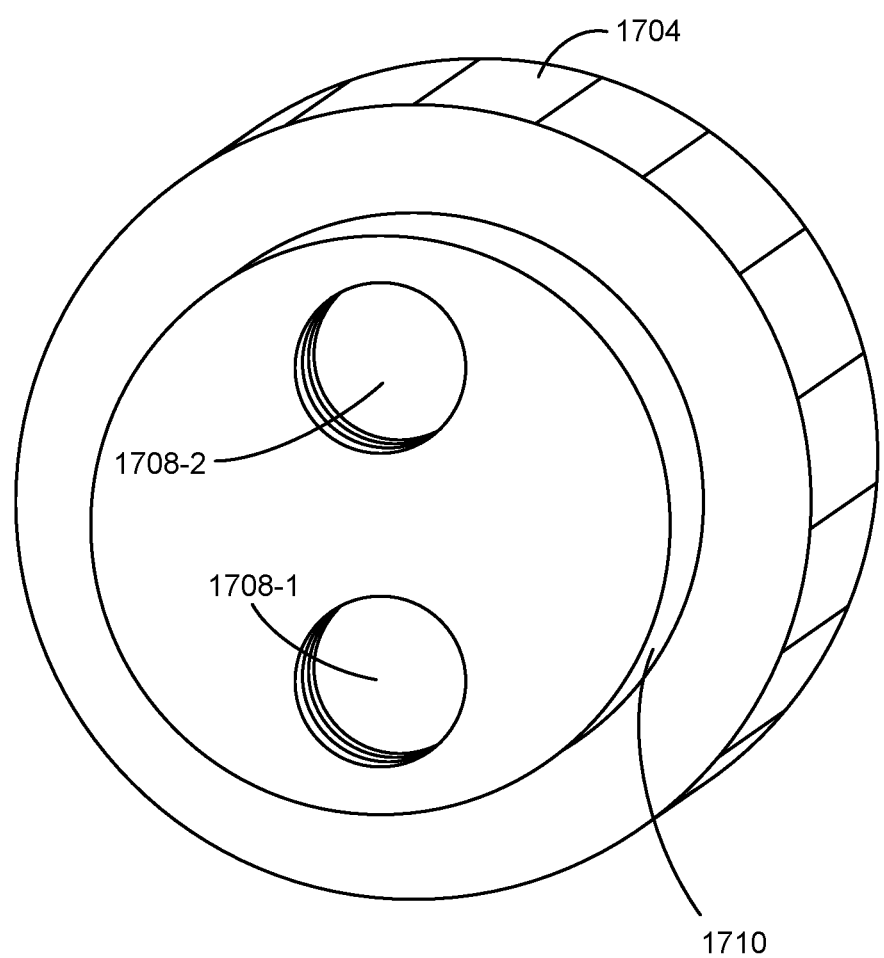

FIGS. 17-19 illustrate an example apparatus 124 for generating truly random numbers, according to some embodiments. The apparatus 124 includes a container 142 that is at least partially filled with a fluid (e.g., a liquid, such as water, or a gas, such as air). Embodiments typically use a viscous fluid. In some embodiments, the container is at least partially filled with fragments (e.g., fragments of bird feathers). One or more objects (e.g., dice) 144 are suspended freely in, added to, dispersed in, or distributed in, the fluid. The apparatus 124 includes one or more agitators 148-6 configured to agitate (e.g., mix, stir, or otherwise move) the fluid. In some embodiments, the time frame for agitation is randomized based upon random values previously generated. This further ensures that the results can never be replicated. In some embodiments, the agitator initiation is based upon a seed value. Some embodiments prove randomness using statistical methods. In some embodiments, the degree of randomness is monitored by a continuous health test provided by the Diehard suite (see https://en.wikipedia.org/wiki/Diehard tests). Once the test results are positive and verified, the entropy is published to the EAAS server.

Note that the movement of the dice (and/or other objects) in the liquid cannot be modeled by particle simulation or predicted. In particular, the random weight and mixture of viscous fluid, the randomization of the agitators, and the multiple color values used ensure that it is impossible to replicate by particle simulation.

The apparatus 124 also includes one or more cameras 146 configured to capture one or more images of the one or more objects 144. The cameras are mounted on the outside of the container with clear visibility into the container. In some embodiments, the cameras are mounted on the top, on the bottom, and/or on the sides of the container.

The apparatus also includes a random number generation circuit 150 coupled to the one or more cameras 146. The circuit 150 can be directly attached to the apparatus or remotely situated (either close to the apparatus, such as a couple of feet, or distant from the apparatus, such as a different node on a network). In some embodiments, the circuit 150 comprises a Raspberry Pi device, an SSD device, and the one or more cameras. In some embodiments, the process (i) captures the images, (ii) hashes the images to extract image noise, (iii) converts the hashed images to binary, (iv) tests the binary data using the Diehard suite, then (v) publishes the binary data to the EAAS server. The random number generation circuit 150 is configured to generate random numbers based on the one or more images captured by the one or more cameras 146. When the one or more agitators 148-6 agitate the fluid, the one or more objects 144 move freely in the fluid in the container 142.

In some embodiments, each object 144 includes one or more physical features. The one or more images captured by the one or more cameras 146 include a subset of physical features of the one or more physical features of the one or more objects 144. The random number generation circuit 150 is further configured to generate the random numbers based on detecting the subset of physical features in the one or more images. In some embodiments, the one or more objects 144 include dice. The one or more physical features include dots on faces of each die. In some embodiments, the features include color, shade, and/or number of faces/sides of each die. In some embodiments, the subset of physical features include one or more dots on each die, and the random number generation circuit 150 is further configured to generate the random numbers based on number of dots detected in the one or more images.

In some embodiments, the apparatus 124 includes a housing configured to fit in a server rack. For example, the housing is sized and/or shaped (e.g., cut) to fit into any server rack environment, such as a 4U/rack assembly. The container 142 is disposed in the housing. In some embodiments, the housing includes an opposing first end 170-2 and a second end 170-4. An agitator 148-6 is attached to one end (e.g., the second end 170-4 of the housing). In some embodiments, the housing includes a top portion 172-2 and a bottom portion 172-4. In some embodiments, the one or more cameras 146 are attached to the top portion 172-2 of the housing, and the one or more cameras 146 are oriented toward the interior of the container 142.

In some embodiments, the apparatus 124 includes one or more lighting units 174 (e.g., a string of LED lights, or an LED light bar) configured to illuminate the container 142 when the one or more cameras 146 capture the one or more images of the one or more objects 144, and/or before/after the operation of the agitators 148-6.

In some embodiments, the random number generation circuit 150 is further configured to receive a request (e.g., from a device controller 134) to generate randomized keys. In response to receiving the request, the random number generation circuit 150 controls the one or more agitators 148-6 to stir the fluid, controls the one or more cameras 146 to capture the one or more images, generates the randomized keys based on the one or more images captured by the one or more cameras 146, stores the generated random numbers in the entropy cache 114, and/or provides the generated random numbers to external requestors (e.g., via an API call).

In some embodiments, the one or more objects 144 have a density similar to the fluid so that (i) the one or more objects 144 suspend freely in the fluid (e.g., move around rather than float/sink) and (ii) when the one or more agitators 148-6 stir the fluid, the one or more objects 144 move freely within the fluid.

In some embodiments, the one or more cameras 146 are disposed outside the container 142, and the container 142 is made of a substantially transparent or see-through material through which the one or more objects 144 are observable.

In the embodiment of FIGS. 17-19, the agitator is a hydraulic pump 1702, connected to the container by a pair of hoses or pipes 1706-1 and 1706-2. In some embodiments, the first hose/pipe 1706-1 pushes fluid into the container and the second hose/pipe pulls fluid from the container (e.g., at the same time). In some embodiments, the hoses 1706-1 and 1706-2 are connected to the container 142 by a rubber cap 1704 with a threaded end 1714 sealed into an opening 1712 on the container 142. As shown in FIG. 19, in some embodiments the rubber cap includes a plastic tube 1710 and has two openings 1708-1 and 1708-2 for the two hoses 1706-1 and 1706-2.

In some embodiments, the openings 1708-1 and 1708-2 are smaller than the objects 144 in the container so that they are not pulled into the hose by the pump 1702. In some embodiments, the openings 1708-1 and/or 1708-2 are covered by a mesh or screen (not shown). In some embodiments, the openings have metal threads to engage the hoses 1706-1 and 1706-2.

Some embodiments include two or more hydraulic pumps and/or use splitters on the hoses 1706-1 and 1708-2 so that the pumping action can be applied at more than one location on the container (e.g., pumping action at both ends 170-2 and 170-4). Some embodiments include two or more different types of agitators, such as a hydraulic pump as shown in FIG. 17 and a rotating agitator as illustrated in FIG. 3.

Some embodiments include a power supply 1804, as shown in FIG. 18. The power supply can supply the power needed for the lights 146, the random number generation circuit 150, and/or the agitators 148-6 (e.g., the hydraulic pump).

Thus, in various embodiments, systems and methods are described for generating truly random numbers and/or cryptographic keys. Some embodiments provide access to the keys via one or more secure architectures.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the scope to the precise forms disclosed. Many modifications and variations are possible in view of the above teachings. The embodiments were chosen and described in order to best explain the main principles and practical applications, to thereby enable others skilled in the art to best utilize the various embodiments and make various modifications as are suited to the particular use contemplated.

What is claimed is:

1. An apparatus for generating truly random numbers, comprising:
    a container that is at least partially filled with a fluid;
    one or more objects suspended freely in the fluid;
    one or more agitators configured to agitate the fluid;
    one or more cameras configured to capture one or more images of the one or more objects; and
    a random number generation circuit coupled to the one or more cameras, the random number generation circuit configured to generate random numbers based on the one or more images captured by the one or more cameras,
    wherein when the one or more agitators agitate the fluid, the one or more objects move freely in the fluid in the container.

2. The apparatus of claim 1, wherein:
    each of the one or more objects includes one or more physical features;
    the one or more images captured by the one or more cameras include a subset of physical features of the one or more physical features of the one or more objects; and
    the random number generation circuit is further configured to generate the random numbers based on detecting the subset of physical features in the one or more images.

3. The apparatus of claim 2, wherein:
    the one or more objects include dice;
    the one or more physical features include dots on faces of each die;
    the subset of physical features include one or more dots on faces of the dice; and
    the random number generation circuit is further configured to generate the random numbers based on a detected number of dots detected in the one or more images.

4. The apparatus of claim 1, further comprising a housing configured to fit in a server rack, wherein the container is disposed in the housing.

5. The apparatus of claim 4, wherein the housing includes opposing first and second ends, a first agitator is attached to the first end and a second agitator is attached to the second end.

6. The apparatus of claim 4, wherein the housing includes a top portion and a bottom portion, the one or more cameras are attached to the top portion of the housing, and the one or more cameras are disposed facing an interior of the container.

7. The apparatus of claim 1, further comprising one or more lighting units configured to illuminate the container when the one or more cameras capture the one or more images of the one or more objects.

8. The apparatus of claim 1, wherein the one or more agitators are disposed outside the container, and the one or more agitators are configured to vibrate or shake the container, thereby agitating the fluid to cause the one or more objects to move in the fluid.

9. The apparatus of claim 1, wherein the one or more agitators are disposed within the container, and the one or more agitators are configured to agitate the fluid by rotation.

10. The apparatus of claim 1, wherein the one or more agitators are coupled to one or more motors configured to cause each of the one or more agitators to rotate, and the random number generation circuit includes a power control unit configured to control power supplied to the one or more motors.

11. The apparatus of claim 1, wherein the one or more agitators comprise a hydraulic pump that circulates the fluid in the container.

12. The apparatus of claim 1, wherein the random number generation circuit is further configured to:
    receive a request for random numbers; and
    in response to receiving the request:
        control the one or more agitators to agitate the fluid;
        control the one or more cameras to capture the one or more images;
        generate the random numbers based on the one or more images captured by the one or more cameras; and
        provide the generated random numbers.

13. The apparatus of claim 1, wherein the one or more objects have a density similar to the fluid so that (i) the one or more objects suspend freely in the fluid, and (ii) when the one or more agitators agitate the fluid, the one or more objects move freely within the fluid.

14. A method for generating truly random numbers, comprising:
    receiving a request for generating one or more randomized keys; and
    in response to receiving the request:
        agitating, using one or more agitators, a fluid in a container filled with one or more objects that are suspended freely in the fluid, thereby causing the one or more objects to move freely in the container;

capturing, using one or more cameras, one or more images of the one or more objects;

generating a randomized key based on the one or more images; and storing the randomized key to a memory unit.

15. The method of claim 14, wherein:

each of the one or more objects includes one or more physical features;

the one or more images captured by the one or more cameras include a subset of physical features of the one or more physical features of the one or more objects; and generating the randomized key is further based on detecting the subset of physical features in the one or more images.

16. The method of claim 14, wherein the container includes opposing first and second ends, and the one or more agitators include a first agitator attached to the first end and a second agitator attached to the second end, the method further comprising:

agitating the fluid using the first agitator;

ceasing to agitate the fluid using the first agitator;

agitating the fluid using the second agitator; and agitating the fluid using the first agitator and the second agitator.

17. A system for generating truly random numbers, the system comprising:

one or more random number generation units, each random number generation unit comprising:

a container that is at least partially filled with a fluid;

one or more objects suspended freely in the fluid;

one or more agitators configured to agitate the fluid;

one or more cameras configured to capture one or more images of the one or more objects; and a random number generation circuit coupled to the one or more cameras and configured to generate random numbers based on the one or more images captured by the one or more cameras, wherein when the one or more agitators agitate the fluid, the one or more objects move freely in the fluid in the container; and a memory unit coupled to the one or more random number generation units, the memory unit configured to store the random numbers generated by the one or more random number generation units.

18. The system of claim 17, further comprising:

a controller unit coupled to the memory unit, the controller unit configured to:

receive a request, from a user, for a randomized key; and in response to receiving the request:

retrieve a random number from the memory unit;

generate the randomized key based on the random number retrieved from the memory unit; and provide the randomized key to the user.

19. The system of claim 18, wherein the controller unit is further configured to delete the random number from the memory unit upon providing the randomized key to the user.

20. The system of claim 19, wherein the controller unit is coupled to the one or more random number generation units and the controller unit is further configured to:

determine whether a number of random numbers stored by the memory unit is below a threshold value;

in accordance with a determination that the number of random numbers stored by the memory unit is below the threshold value:

select a candidate random number generation unit from the one or more random number generation units;

for the candidate random number generation unit:

control the one or more agitators to agitate the fluid;

control the one or more cameras to capture the one or more images; and generate a plurality of random numbers based on the one or more images captured by the one or more cameras; and cause the memory unit to store the plurality of random numbers generated by the candidate random number generation unit.

* * * * *